(12) United States Patent
Noth

(10) Patent No.: US 12,290,200 B2
(45) Date of Patent: May 6, 2025

(54) CODE AND CONTAINER OF SYSTEM FOR PREPARING A BEVERAGE OR FOODSTUFF

(71) Applicant: SOIÉTÉ DES PRODUITS NESTLÉ S.A., Vevey (CH)

(72) Inventor: Andre Noth, Pully (CH)

(73) Assignee: Societe des Produits Nestle S.A., Vevey (CH)

( * ) Notice: Subject to any disclaimer, the term of this patent is extended or adjusted under 35 U.S.C. 154(b) by 1015 days.

(21) Appl. No.: 16/078,917

(22) PCT Filed: Feb. 23, 2017

(86) PCT No.: PCT/EP2017/054146
§ 371 (c)(1),
(2) Date: Aug. 22, 2018

(87) PCT Pub. No.: WO2017/144575
PCT Pub. Date: Aug. 31, 2017

(65) Prior Publication Data
US 2021/0177191 A1   Jun. 17, 2021

(30) Foreign Application Priority Data
Feb. 23, 2016 (EP) .................................... 16156866

(51) Int. Cl.
*A47J 31/44* (2006.01)
*B65D 85/804* (2006.01)
*G06K 19/06* (2006.01)

(52) U.S. Cl.
CPC .... *A47J 31/4492* (2013.01); *G06K 19/06168* (2013.01)

(58) Field of Classification Search
CPC ............. A47J 31/4492; B65D 85/8043; B65D 85/8058
See application file for complete search history.

(56) References Cited

U.S. PATENT DOCUMENTS 5,345,435 A * 9/1994 Yamasaki .......... G11B 7/24079
5,700,998 A * 12/1997 Palti ....................... G16H 20/13
235/494

(Continued)

FOREIGN PATENT DOCUMENTS

AU   2007254626   7/2009
CN   1932451 A   3/2007

(Continued)

OTHER PUBLICATIONS

Chinese Office Action for Appl No. 201780011500.7 dated Apr. 12, 2021.

*Primary Examiner* — Dana Ross
*Assistant Examiner* — Lawrence H Samuels
(74) *Attorney, Agent, or Firm* — K&L Gates LLP

(57) ABSTRACT

A container for a foodstuff or beverage preparation machine, the container for containing beverage or foodstuff material and comprising a code encoding preparation information, the code comprising a reference portion and a data portion: the reference portion comprising an arrangement of at least two reference units defining a reference point and a reference line r extending from said point; the data portion comprising a data unit arranged on an encoding line D, the encoding line D extending from the reference point and arranged at an angle a to the reference line r, the data unit arranged a distance d from the reference point as a variable to at least partially encode a parameter of the preparation information.

25 Claims, 10 Drawing Sheets

(56) References Cited

U.S. PATENT DOCUMENTS

| | | | | |
|---|---|---|---|---|
| 6,820,535 B2* | 11/2004 | Fischer | | A47J 31/3628 |
| | | | | 99/289 R |
| 7,444,925 B2* | 11/2008 | Mahlich | | A47J 31/3642 |
| | | | | 99/289 P |
| 9,320,385 B2* | 4/2016 | Spiegel | | A47J 31/3676 |
| 9,980,596 B2* | 5/2018 | Rognon | | B65D 85/8058 |
| 10,117,539 B2* | 11/2018 | Rognon | | A47J 31/3623 |
| 2004/0089158 A1* | 5/2004 | Mahlich | | B65D 85/8043 |
| | | | | 99/275 |
| 2004/0112222 A1* | 6/2004 | Fischer | | A47J 31/3638 |
| | | | | 99/279 |
| 2012/0295234 A1* | 11/2012 | Rognon | | B65D 85/8058 |
| | | | | 434/127 |
| 2013/0014648 A1* | 1/2013 | Rognon | | B65D 85/8058 |
| | | | | 426/87 |
| 2013/0312619 A1* | 11/2013 | Spiegel | | A47J 31/3676 |
| | | | | 426/87 |
| 2014/0370161 A1* | 12/2014 | Abegglen | | A47J 31/22 |
| | | | | 426/115 |
| 2015/0351583 A1* | 12/2015 | Weigelt | | G06K 19/067 |
| | | | | 426/87 |
| 2016/0016705 A1* | 1/2016 | Alderson | | B65D 43/02 |
| | | | | 493/324 |
| 2016/0242594 A1* | 8/2016 | Empl | | A47J 31/407 |

FOREIGN PATENT DOCUMENTS

| | | | | |
|---|---|---|---|---|
| CN | 201237797 Y | 5/2009 | | |
| CN | 102711566 A | 10/2012 | | |
| CN | 104376328 A | 2/2015 | | |
| CN | 104620580 A | 5/2015 | | |
| CN | 204361860 U | 5/2015 | | |
| CN | 105095937 A | 11/2015 | | |
| CN | 105188491 A | 12/2015 | | |
| CN | 105191147 A | 12/2015 | | |
| JP | 2005196456 A | 7/2005 | | |
| WO | 2011152296 | 12/2011 | | |
| WO | WO-2011152296 A1 * | 12/2011 | ....... | G06K 19/06168 |
| WO | 2014096082 | 6/2014 | | |
| WO | 2014096405 | 6/2014 | | |
| WO | WO-2015055849 A1 * | 4/2015 | ........ | A23C 9/1508 |

* cited by examiner

CODE AND CONTAINER OF SYSTEM FOR PREPARING A BEVERAGE OR FOODSTUFF

CROSS REFERENCE TO RELATED APPLICATIONS

The present application is a National Stage of International Application No. PCT/EP2017/054146, filed on Feb. 23, 2017, which claims priority to European Patent Application No. 16156866.2, filed on Feb. 23, 2016, the entire contents of which are being incorporated herein by reference.

TECHNICAL FIELD

The described embodiments relate generally to beverage or foodstuff preparation systems which prepare a beverage or foodstuff from containers such as coffee capsules, and in particular to codes arranged on the container that encode preparation information for reading by a machine of said system.

BACKGROUND

Increasingly systems for the preparation of a beverage or foodstuff are configured to operate using a container that comprises a single-serving of a beverage or foodstuff material, e.g. coffee, tea, ice cream, yoghurt. A machine of the system may be configured for preparation by processing said material in the container, e.g. with the addition of fluid, such as milk or water, and the application of mixing thereto. Such a machine is disclosed in PCT/EP2013/072692. Alternatively, the machine may be configured for preparation by at least partially extracting an ingredient of the material from the container, e.g. by dissolution or brewing. Examples of such machines are provided in EP 2393404 A1, EP 2470053 A1, WO 2009/113035.

The increased popularity of these machines may be partly attributed to enhanced user convenience compared to a conventional preparation machine, e.g. compared to a manually operated stove-top espresso maker or cafetière (French press).

It may also be partly attributed to an enhanced preparation process, wherein preparation information specific to the container and/or material therein is: encoded in a code on the container; read by the machine; decoded; and used by the machine to optimise the preparation process. In particular, the preparation information may comprise operational parameters of the machine, such as: fluid temperature; preparation duration; mixing conditions; and fluid volume.

Accordingly, there is a need to code preparation information on the container. Various codes have been developed, an example is provided in EP 2594171 A1, wherein a periphery of a flange of a capsule comprises a code arranged thereon. The code comprises a sequence of symbols that can be printed on the capsule during manufacture. A drawback of such a code is that its encoding density is limited, i.e. the amount of preparation information that it can encode is limited. A further drawback is that the code is highly visible and may be considered aesthetically displeasing. EP2525691 A1 discloses a container with a 2D barcode, which has a higher albeit limited encoding density.

Thus in spite of the considerable effort already invested in the development of said systems further improvements are desirable.

SUMMARY

An object of the present disclosure is to provide a container of a beverage or foodstuff system that comprises a code that has a high encoding density. It would be advantageous to provide such a code that is less visible than the prior art. It would be advantageous to provide such a code that is un-complicated such that it does not comprise a large number of symbols. It would be advantageous to provide such a code that can suitable encode parameters of the preparation information that have a wide numerical range. It would be advantageous to provide such a code that is cost-effective to produce and that can be read and processed by a cost-effective code processing subsystem. It would be advantageous to provide such a code that can be reliably read and processed.

Disclosed herein according to a first embodiment is a container for use (e.g. it is suitably dimensioned) by a beverage or foodstuff preparation machine, in particular the machine according to the fourth embodiment. The container for containing beverage or foodstuff material (e.g. it has an internal volume and may be food safe). The container may be a single-serving container, i.e. it is dimensioned for containing a dosage of beverage or foodstuff material for preparation of a single serving (e.g. pre portioned) of said product. The container may be a single-use container, i.e. it is intended to be used in a single preparation process after which it is preferably rendered unusable, e.g. by perforation, penetration, removal of a lid or exhaustion of said material. In this way the container may be defined as disposable. The container comprises (e.g. on a surface thereof) a code encoding preparation information, the code comprising a reference portion and a data portion. The reference portion providing a reference position for the data portion. The reference portion comprising an arrangement of at least two reference units defining a reference point and a reference line r extending from said point. The reference line r being linear. The data portion comprising a data unit arranged on (e.g. with at least a portion thereof, generally a centre, intersecting said line) an encoding line D, the encoding line D extending from the reference point and arranged at an angle α (which typically is not zero or the equivalent) at the reference point to the reference line r, the data unit arranged a distance d from the reference point as a variable to at least partially encode a parameter of the preparation information.

On advantage is that a high encoding density is achievable since the encoding line D has a radial arrangement, further encoding lines can be compactly added to encoding further information. Moreover the code is convenient to process since a Polar coordinate system can be utilised, whereby: the origin is the reference point; the reference line r is the reference direction. The distance d can be determined conveniently by identifying the reference point and the distance of the data unit therefrom. Image processing of a code using this coordinate system is less computationally intensive than for an example code that uses a Cartesian coordinate system, whereby the axis are defined by a reference line and a linear encoding line that extends orthogonally thereto. In particular a Cartesian arrangement requires the image of the code reorienting during processing which is obviated when using a Polar coordinate system. In this way a more cost-effective image processor can be used. Moreover the code has a high encoding density since a plurality of encoding lines D can be arranged concentrically about the origin, with each comprising one or more associated data unit.

The preparation information may comprise information that is related to a preparation process, e.g. one or more parameters used by the machine such as: temperature; torque and angular velocity (for mixing units of machines which effect mixing); flow rate/volume; pressure; % cooling power; time (e.g. for which a phase comprising one or more of the aforesaid parameters are applied for); expiry date; container geometric properties; phase identifier (for containers comprising multiple codes, whereby each of which encodes a distinct phase of a preparation process); container identifier; a recipe identifier that may be used to retrieve one or more parameters of the machine which are used by the machine to prepare the product, wherein said parameters may be stored on the machine; pre-wetting volume.

The code preferably has a planform with a peripheral length (e.g. a diameter of a circular periphery or side length of a rectangular periphery) of 600-1600 µm or 600-6000 µm. One advantage is that the code is not particularly visible. A further advantage is that capturing an image of the code for reading and decoding the information contained therein can be done with a small image capturing device, for example with a camera having dimensions in the magnitude of a few millimetres, whose size provides for an easy and reliable integration in a machine according to the fourth embodiment. More particularly, the units (i.e. the data units and reference units) that comprise the code preferably have a unit length of 50-250 µm. The aforesaid unit length may be defined as: a diameter for a substantially circular unit; a side length for a quadrilateral unit; other suitable measure of length for a unit of another shape of unit.

A rectangular planform of the code is advantageous since it forms a tessellating shape. A tessellating shape is particularly advantageous since a plurality of codes can be compactly repeated on the container, e.g.: for read error checking, thereby allowing the design of robust code decoding algorithms able to correct code reading and/or decoding errors using several codes encoding the same information and thus minimizing the code reading failure rate; and/or with separate phases of a preparation process encoded by each code. Accordingly, the first embodiment may comprise a plurality of the said codes formed on a container in an at least partially tessellating manner (e.g. a grid with adjacent columns aligned or with adjacent columns offset), whereby the codes preferably encode different phases of a preparation process. Encoding several phases of a preparation process on a container allows for example encoding all parameters necessary for the preparation of complex recipes, for example recipes comprising several preparation phases and/or recipes requiring simultaneous or sequential processing of two or more containers and/or of two or more ingredients in two or more compartments within the same container, in order to obtain two or more ingredients such as for example milk and coffee, ice-cream and topping, milkshake and flavouring, etc.

According to the invention, all processing parameters necessary for a recipe being preferably encoded in one or more codes on the corresponding one or more containers, recipes may be updated by providing containers with updated codes thereon, said updated codes encoding updated/modified/new parameter values. New recipes and/or new containers with specific parameter values may furthermore be introduced and processed by a machine according to the fourth embodiment without reprogramming of the machine. Accordingly, updated and/or new recipes may be introduced in the system of the invention without having to update the machine's soft- or firmware.

The attachments according to the further embodiments may also comprise the aforesaid plural code arrangement.

A data unit may be arranged any continuous distance d from reference point. One advantage is that a high encoding density can be achieved as it can encode information in a continuous manner rather than a discrete manner. Alternatively, the data units may be arranged only discrete distances from the reference point (i.e. the data unit can only occupy one of a plurality of predetermined positions along the line D which generally do not overlap and may have a discrete separation between adjacent positions). In the instance of more than one encoding line D and/or more than one data units arranged along the line(s) the data units may be arranged with combinations of continuous and discrete distances.

The reference portion may comprise a reference line orientation identifier to define the orientation of the reference line r. In particular the orientation identifier may define the reference point, e.g. it is arranged at or proximate the reference point (it may however in a less preferred example be arranged distal the reference point). In examples not comprising said orientation identifier the reference point may be identified as a portion at the end of the reference line r, which can be defined by a plurality of same reference units. The orientation identifier may comprise one or more reference units.

In the example of one reference unit comprising said orientation identifier the aforesaid reference point is preferably at the centre of the reference unit. The reference unit may be identifiable from other units of code by one or more of the following: it comprises a reference unit distinct from the other units of the code in terms of one of more of the following: shape, size, colour. An advantage it is convenient for a processor to determine an orientation of the reference line r. The orientation identifier is for example a unit greater in size than the other units of the code In the example of a plurality of reference units comprising said orientation identifier, each of the plurality of reference units may be the same as the other data unit(s) of the code and/or the other reference unit(s) that comprise the reference line r. In particular the reference units that comprise the reference unit orientation identifier may be arranged with a configuration defining the aforesaid reference point. Said configuration may comprise a 2 dimensional polygon with the reference units arranged at the vertices and said point at the centre or at another geometrically defined position of the polygon. The polygon is for example a polygon with equal side lengths. The polygon may be one selected from a group comprising: a triangle; square; pentagon; hexagon; heptagon; octagon. It is advantageous to have all of the units of the code the same since the complexity of processing the code is reduced. In particular, a computer program only has to determine the presence of a unit and its centre, as opposed to discriminated between different shapes and/or colours. Consequently a more cost effective processor can be utilised in the beverage or foodstuff preparation machine.

The reference line r preferably extends through or at a predetermined minimal distance, or offset, from a central point of a further reference unit. The further reference unit of the reference portion may be identifiable by one or more of the following: it is arranged at a greater radial position from said orientation identifier (i.e. between their said points) than the data units and/or at a predetermined reserved radial position from said orientation identifier (e.g. a particular position, such as 400-600 µm), whereby the data units are not arranged at said predetermined radial position; it is distinct from the other units of the code in terms of one of more of the following: shape, size, colour; it is arranged at an end of or at a predetermined minimal distance, or offset, from the reference line r. An advantage is that the reference line r can be conveniently determined by locating the orientation identifier and the further reference unit. To maintain compact formation of the code it is preferable to represent the further reference unit by a unit no larger in size than the data units, e.g. by the same shape and size unit.

According to the invention, the code thus comprises reference units defining a reference point and a reference line for determining the centre and orientation of the polar code. There is therefore no requirement of a specific alignment of the container relative to the image capturing device when placed in the machine of the fourth embodiment for processing. The code processing subsystem will be able to determine the centre and orientation of the code with the position of the reference units in a captured image, independently of the relative orientation of the container and the image capturing device when the image was taken.

The data portion may have an encoding area, within which the encoding lines D are arranged, the data units thereof being arrange within the bounds of the encoding area. The encoding area may be circular at a periphery. Alternatively the encoding area may be rectangular at a periphery, e.g. the encoding lines D extend up to the vertices of said periphery. The rectangular periphery thus provides a tessellating shape. A tessellating shape is particularly advantageous since a plurality of codes can be compactly repeated on the container, e.g.: for read error checking; and/or with separate phases of a preparation process encoded by each code. Accordingly, the first embodiment may comprise a plurality of the said codes formed on a container in a tessellating manner (e.g. a grid with adjacent columns aligned or with adjacent columns offset), whereby the codes preferably encode different phases of a preparation process. The attachments according to the further embodiments may also comprise the aforesaid plural code arrangement.

Preferably a data unit may be arrangeable up to and not overlapping the orientation identifier and/or the reference point e.g. a periphery of the data unit can be coincident to and extend from the orientation identifier. An advantage is that there is sufficient separation between the reference line r and data units for processing. Preferably the units are not arranged overlapping each other.

The data unit may further encode metadata associated with the parameter. The metadata is preferably encoded discretely (e.g. it can assume one of a predetermined number of values). The metadata is generally to: enable identification of the particular parameter; and/or a property associated with the parameter (e.g. a ± or an exponent). A unit length of a data unit may be selected from one of a plurality of predetermined unit lengths as a variable to encode the metadata. The aforesaid unit length may be defined as: a diameter for a substantially circular unit; a side length for a quadrilateral unit; other suitable measure of length for a unit of another shape of unit. An offset of a centre of a data unit from the encoding line D, the offset along an offset line orthogonal the encoding line, the may be selected from one of a plurality of predetermined offsets as a variable to encode the metadata. Preferably said offset is achieved within the bounds of at least part of the associated data unit intersecting the encoding line D.

The data portion may comprise a plurality of encoding lines D (e.g. up to 2, 3, 4, 5, 6, 10, 16, 20 or more), each comprising a corresponding arrangement of a data unit (i.e. the data unit is arranged a distance d from the reference point to at least partially encode a parameter). The encoding lines D may be arranged at equal angles to each other (i.e. at equally incremented angles from the reference line r). Alternately they are arbitrarily spaced. In particular a plurality (e.g. 2, 3, 4, 5, 6 or more) of encoding lines D may encode a phase, whereby there are a plurality of phases (e.g. 2, 3, 4, 5, 6 or more) encoded on the code.

Moreover a plurality of data units may be arranged along a single encoding line D. An advantage is that the encoding density is increased. In such an arrangement each data unit may be identifiable by the metadata. Each of the said data units may encode a separate parameter. Alternatively a plurality of the data units may encode a single parameter, whereby a distance d encoding said parameter may be a function (e.g. an average or a multiple) of the distances do of said plurality of data units.

The data units and reference units may be formed by one of the following: printing (e.g. by a conventional ink printer, an advantage is that the code can be conveniently and cost-effectively formed); engraving; embossing. The code may be formed directly on a surface of the container, e.g. the substrate for the units is integral with the container. Alternatively the code may be formed on an attachment, which is attached to the container.

The container may comprise the beverage or foodstuff material contained therein. The container may comprise one of the following: capsule; packet; receptacle for end user consumption of the beverage or foodstuff therefrom. The capsule may have an internal volume of 5-80 ml. The receptacle may have an internal volume of 150-350 ml. The packet may have an internal volume of 150-350 ml or 200-300 ml or 50-150 depending on the application.

Disclosed herein according to a second embodiment is a method of encoding preparation information, the method comprising forming a code according to the first embodiment on: a container for a foodstuff or beverage preparation machine, the container for containing beverage or foodstuff material; or an attachment for attachment to said container or said machine. The method may comprise encoding information with the code according to any feature of the first embodiment. In particular the method may comprise: arranging at least two reference units to define a reference point and a reference line r extending from said point of a reference portion; and at least partially encoding a parameter of the preparation information with a data portion of the code by arranging a data unit on an encoding line D that extends from the reference point and arranged at an angle α to the reference line r, the data unit being arranged a distance d extending along the encoding line D from said intersection as a variable for said encoding. The method may comprise forming the code by one of the following: printing; engraving; embossing. The method may comprise forming a plurality of said codes preferably in an at least partially tessellating arrangement.

Disclosed herein according to a third embodiment is a method (e.g. a computer implemented method) of decoding preparation information, the method comprising obtaining a digital image of a code of a container according to the first embodiment, or the attachments according to the seventh and eighth embodiments; processing said digital image to decode the encoded preparation information.

Processing of the digital image to decode the preparation information may comprise: locating the reference and data units of the code; identifying at least two reference units and determining therefrom the reference point and reference line r extending from said point; determining (i.e. for the or each of the encoding lines D) for a data unit a distance d along the encoding line D from the reference point; converting the determined distance d into an actual value of a parameter $V_p$.

The locating of the units of the code (i.e. data and reference units) may comprise one or more of the following: conversion of the digital image to a binary image; determining a centre of the units by feature extraction; determining a size/area/shape of the units by pixel integration (i.e. determining a number of pixels of a shaded region that comprise the unit).

Identifying at least two reference units and determining therefrom the reference point and reference line r extending from said point may comprise one or more of the following: identifying units with a linear arrangement; identifying units and/or points defined by units that are a predetermined distance apart; identifying units that are a particular shape or size or colour; identifying particular configurations of units. Preferably it comprises identifying the or each reference unit corresponding to the orientation identifier by one or more of shape, size, colour, configuration (for a plurality of units defining said identifier), determining therefrom the reference point, and optionally determining a further reference unit with a greater radial position from the orientation identifier than the data units and/or at a predetermined reserved radial position from the orientation identifier.

Determining for each data unit a distance d along the encoding line D from the reference point may comprise determining a distance between a centre of the data unit and a centre or a periphery of the reference point, and may include correcting for magnification/reading distance.

Converting the determined distance d into an actual value of a parameter $V_p$ may comprise converting the determined distance d into an actual value of a parameter $V_p$ using a stored relationship (e.g. information stored on a memory unit of the machine, and may comprise the memory subsystem) between the parameter and distance d. The relationship may be linear, e.g. $V_p \propto d$ and/or it may be non-linear. The relationship may comprise at least one selected from a group consisting of: a logarithmic relationship, e.g. $V_p \propto \log(d)$; an exponential relationship, e.g. $V_p \propto e^d$; a polynomial; a step function; linear. Exponential and logarithmic relationships are particular advantageous when the accuracy of a parameter is important at low values and less important at high values or the converse respectively. Typically the relationship is stored as an equation or as a lookup table. The relationship may be applied to any suitable variable of the preparation information, such as: temperature; torque; flow rate/volume; pressure; % cooling power. One advantage is the execution of complex recipes, which may be determined by the particular material in the container and the functionality of the machine.

Determining for each data unit a distance d along the encoding line D from the reference point may comprise determining the arrangement of the encoding lines D, e.g. the position is encoded by the encoding line proximal the reference line; the position is a stored relationship (i.e. information stored on a memory unit of the machine). In particular a parameter may be identified by its angular distance from the reference line.

Processing of the digital image to decode the preparation information may further comprise determining metadata associated with the data unit of the encoded parameter, e.g. by one or more of the following: determining a unit length of a data unit; determining an offset of a data unit to the encoding line D. The aforesaid determining may be by feature extraction or overall area/shape by pixel integration.

Processing of the digital image to decode the preparation information may comprise decoding each of a plurality of phases encoded on the code.

Disclosed herein according to a fourth embodiment is a beverage or foodstuff preparation machine comprising: a container processing subsystem to receive a container according to the first embodiment and to prepare a beverage or foodstuff therefrom; a code processing subsystem operable to: obtain a digital image of the code of the container; process said digital image to decode the encoded preparation information; a control subsystem operable to effect one more of the following: control of said container processing subsystem using said decoded preparation information; use of the preparation information to monitor container consumption for re-ordering, e.g. via a server system through a communication interface; use of the preparation information to determine if a container has exceeded its expiry date. The code processing subsystem may further be configured to process the digital image of the code according to the third embodiment.

The container processing subsystem generally is operable to perform said preparation by the addition of fluid, such as water or milk to the beverage or foodstuff material. The container processing subsystem may comprise one of: an extraction unit; a dissolution unit; a mixing unit. The container processing subsystem may further comprise a fluid supply that is operable to supply fluid to the aforesaid unit. Generally the fluid supply comprises a fluid pump and a fluid heater. The aforesaid units may be configured for operation with one or more container containing beverage or foodstuff material.

Control of said container processing subsystem using said decoded preparation information may in particular comprise executing a preparation process in phases, whereby preparation information for the phases is decoded from a code and/or from a plurality of codes encoding a plurality of phases as according in the first embodiment. Said decoded preparation information for several phases may for example be used to control the container processing subsystem to perform complex recipes implying for example processing of two or more containers, and/or processing of two or more ingredients in several individual compartments within a same container, preferably upon a single user actuation, for example upon a single push of a button of the machine's user interface. In embodiments, based for example on the information decoded from a first container, the control subsystem checks for the presence in the machine of a particular second container or ingredient compartment, before or after processing the first container or ingredient compartment, and pauses the preparation process if said second container or ingredient compartment cannot be found. Once a second container or ingredient compartment of the expected type is detected in the machine, the preparation process is resumed and the second container or ingredient compartment is processed.

Disclosed herein according to a fifth embodiment is a beverage or foodstuff preparation system comprising a container according to the first embodiment and a beverage or foodstuff preparation machine according to the fourth embodiment.

Disclosed herein according to a sixth embodiment is a method of preparing a beverage or foodstuff using the system according to the fifth embodiment, the method comprising: obtaining a digital image of a code according to the first embodiment (which may be arranged on the container or the attachments according to further embodiment); processing said digital image to decode the encoded preparation information; operating a control subsystem to effect one more of the following: control of said container processing subsystem using said decoded preparation information; use of the preparation information to monitor container consumption for re-ordering, e.g. via a server system through a communication interface; use of the preparation information to determine if a container has exceeded its expiry date. The method may further comprise any of the steps of processing the digital image of the code according to the third embodiment.

Disclosed herein according to a seventh embodiment is an attachment configured for attachment to a container for a beverage or foodstuff preparation machine according to the fourth embodiment. The container is preferably according to any feature of the first embodiment, preferably without the code thereon. The attachment may comprise: a carrier carrying (e.g. on a surface thereof) a code according to the first embodiment; an attachment member for attachment to said container. The attachment is preferably configured for attaching said carrier to the container as if the code were formed integrally on the container. In this way the code can be read by an image capturing device as if it were formed integrally thereon. The attachment may be configured to extend over a substantial portion of the container, e.g. a base or lid or rim. Examples of suitable attachment members comprise: an adhesive strip (or a planar region for receiving adhesive); a mechanical fastener such as a clip or bolt.

Disclosed herein according to an eighth embodiment is an attachment configured for attachment to a beverage or foodstuff preparation machine according to the fourth embodiment. The attachment may comprise: a carrier carrying (e.g. on a surface thereof) a code according to first embodiment; an attachment member for attachment to said machine. The attachment member is preferably configured for attaching said carrier to the machine at a position between an image capturing device of said machine and the container when received, such that the code thereon is proximate said container. In this way it can be read by the image capturing device as if it were attached to the container. Examples of suitable attachment members comprise: extensions attached to said carrier comprising an adhesive strip (or a planar region for receiving adhesive) or a mechanical fastener such as a clip, bolt or bracket.

Disclosed herein according to a ninth embodiment is a use of a container as defined in the first embodiment or the attachments as defined in the seventh and eighth embodiment for a beverage or foodstuff preparation machine as defined in the fourth embodiment.

Disclosed herein according to a tenth embodiment is a use of a code as defined in the first embodiment for encoding preparation information preferably on: a container of a beverage or foodstuff preparation machine, the container for containing beverage or foodstuff material as defined in the first embodiment; or an attachment according to the seventh or eighth embodiment.

Disclosed herein according to a eleventh embodiment is provided a computer program executable on one or more processors of a code processing subsystem of a beverage or foodstuff preparation machine generally as defined in the fourth embodiment to decode encoded preparation information. The computer program may comprise program code executable by the or each processor and/or program logic implemented on the or each processor (it may also comprise program code for implementation of said program logic). The computer program may be operable to decode the information of the code according to any feature of the first embodiment via any feature of the third embodiment. The computer program may further be executable to obtain (e.g. by controlling an image capturing device) said digital image of the code.

The functional units described by the computer programs generally herein may be implemented, in various manners, using digital electronic logic, for example, one or more ASICs or FPGAs; one or more units of firmware configured with stored code; one or more computer programs or other software elements such as modules or algorithms; or any combination thereof. One embodiment may comprise a special-purpose computer specially configured to perform the functions described herein and in which all of the functional units comprise digital electronic logic, one or more units of firmware configured with stored code, or one or more computer programs or other software elements stored in storage media.

Disclosed herein according to an twelfth embodiment is provided a non-transitory computer readable medium comprising the computer program according to the eleventh embodiment. The non-transitory computer readable medium may comprise a memory unit of the processor or other computer-readable storage media for having computer readable program code for programming a computer stored thereon, e.g. a hard disk, a CD-ROM, an optical storage device, a magnetic storage device, Flash memory; a storage device of a server for download of said program.

Disclosed herein according to a thirteenth embodiment is an information carrying medium comprising the code according to the first embodiment. In particular the information carrying medium may comprise the container as defined herein, either of the attachments as defined herein, or a substrate, such as an adhesive strip of other suitable medium.

The method of encoding preparation information according to the second embodiment may be applied to the information carrying medium. The method of decoding preparation information according to the third embodiment may be applied to the information carrying medium. The beverage or foodstuff preparation machine according to the fourth embodiment may be configured for operation with the information carrying medium, e.g. via its attachment to the container or other suitable component, such as either of the aforedescribed attachments. The system according to fifth may comprise the information carrying medium. The method of preparing a beverage or foodstuff of the sixth embodiment may be adapted to comprise obtaining a digital image of the code of the information carrying medium.

The preceding summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Moreover, the above embodiments may be combined in any suitable combination to provide further embodiments. Other features, aspects, and advantages of the subject matter described herein will become apparent from the following Detailed Description, Figures, and Claims.

DETAILED DESCRIPTION OF EXEMPLARY EMBODIMENTS

Beverage/Foodstuff Preparation System

Figure 1A:
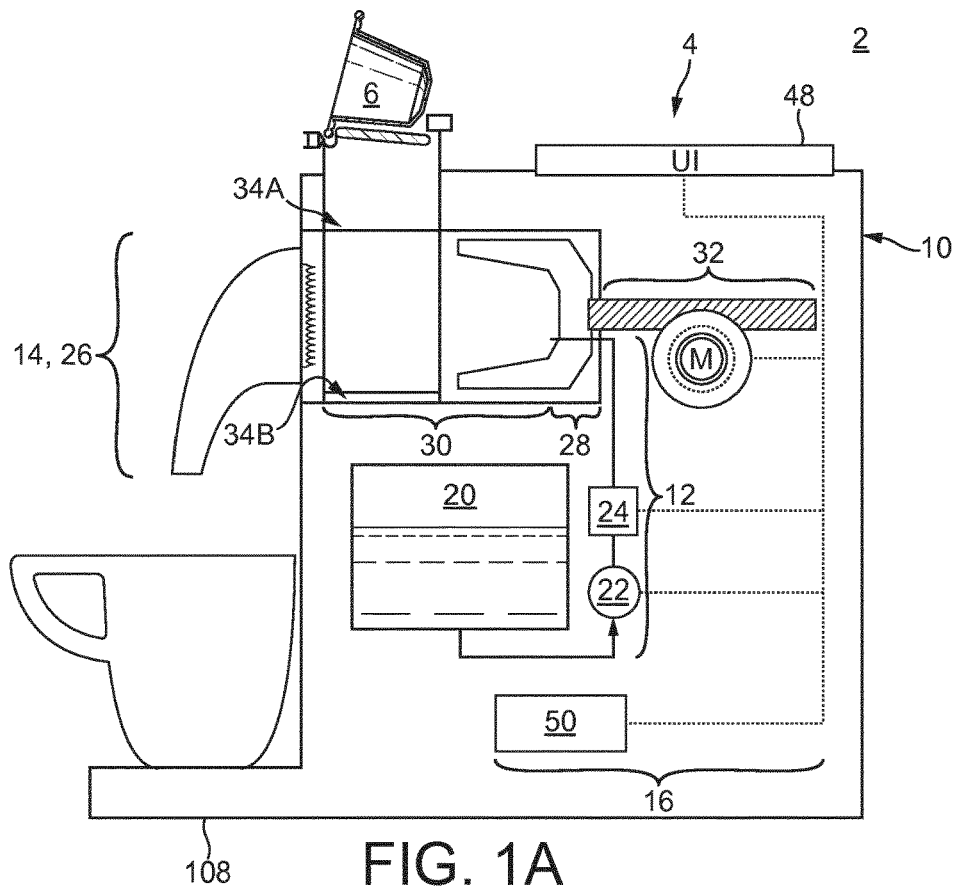
FIG. 1 is a diagrammatic drawing illustrating embodiments of beverage or foodstuff preparation systems that comprises a machine and a container according to embodiments of the present disclosure.

A beverage or foodstuff preparation system 2, an embodiment of which is illustrated in FIG. 1, comprises: a beverage or foodstuff preparation machine 4; a container 6, which are described following.

Preparation Machine

The beverage or foodstuff preparation machine 4 is operable to process a beverage or foodstuff material (hereon material) arranged in the container 6 to a foodstuff and/or beverage for consumption by eating and/or drinking. Generally processing comprises the addition of fluid, such as water or milk to said material. A foodstuff material as defined herein may comprise a substance capable of being processed to a nutriment generally for eating, which may be chilled or hot. Generally the foodstuff is a liquid or a gel. Non-exhaustive examples of which are: yoghurt; mousse; parfait; soup; ice cream; sorbet; custard; smoothies. Generally the foodstuff is a liquid, gel or paste. A beverage material as defined herein may comprise a substance capable of being processed to a potable substance, which may be chilled or hot, non-exhaustive examples of which are: tea; coffee, including ground coffee; hot chocolate; milk; cordial. It will be appreciated that there is a degree of overlap between both definitions, i.e. a said machine 4 can prepare both a foodstuff and a beverage.

The machine 4 is generally dimensioned for use on a work top, i.e. it is less than 70 cm in length, width and height.

The machine 4 comprises: a housing 10; a container processing subsystem 14; a control subsystem 16; and a code processing subsystem 18.

Housing

The housing 10 houses and supports the aforesaid machine components and comprises: a base 108 for abutment of a horizontally arranged support surface; a body 110 for mounting thereto said components.

Container Processing Subsystem

Depending on the particular embodiment the container processing subsystem 14 (which may also be considered a preparation unit) may be configured to prepare a foodstuff/beverage by processing material arranged in: one or more single-serving, single use container 6 that is a packet and/or capsule; a container 6 that is a receptacle for end-user consumption therefrom. In particular the material is processed to effect a change of its composition, e.g. by dissolution or extraction or mixing of an ingredient thereof. Embodiments of each configuration of will be discussed. Two or more such configurations may be combined in a single container processing subsystem 14 in order for example to prepare a foodstuff/beverage from material contained in two or more containers 6 and requiring different processing. In embodiments, a container processing subsystem 14 may for example be configured to simultaneously or sequentially: in a pressurised extraction unit, extract coffee from a capsule containing ground coffee and; in a dissolution unit, dilute powdered milk contained in a packet; in order to prepare a milk and coffee beverage such as for example a cappuccino, a cafe latte or a latte macchiato. In other embodiments, a container processing subsystem 14 may for example be configured to simultaneously or sequentially: prepare at least part of a foodstuff/beverage in a receptacle for end user consumption in a mixing unit and; possibly dilute material contained in a container and dispense it into the receptacle; in order for example to prepare a serving of ice-cream with topping or a flavoured milk-shake. Other feature combinations in a single container processing subsystem 14 are however possible within the frame of the invention in order to allow the preparation of foodstuff/beverages according to other complex recipes.

In general in all the embodiments the container processing subsystem 14 comprises a fluid supply 12 that is operable to supply fluid to the container 6. The fluid is in general water or milk, the fluid maybe conditioned (i.e. heated or cooled). The fluid supply 12 typically comprises: a reservoir 20 for containing fluid, which in most applications is 1-5 litres of fluid; a fluid pump 22, such as a reciprocating or rotary pump that may be driven by an electrical motor or an induction coil (although in one example the pump may be replaced with connection to a mains water supply); an optional fluid thermal exchanger 24 (typically a heater), which generally comprises an in-line, thermo block type heater; an outlet for supplying the fluid. The reservoir 20, fluid pump 22, fluid heater 24, and outlet are in fluid communication with each other in any suitable order and form a fluid line. The fluid supply 12 may optionally comprise a sensor to measure fluid flow rate and/or the amount of fluid delivered. An example of such a sensor is a flow meter, which may comprises a hall or other suitable sensor to measure rotation of a rotor, a signal from the sensor being provided to the processing subsystem 50 as will be discussed.

Container Processing Subsystem for Extraction of Foodstuff/Beverage from Container According to a first embodiment the container processing subsystem 14 is operable: to receive the container 6 containing material; process the container 6 to extract one or more ingredients of a beverage or foodstuff therefrom, and to dispense the said ingredients into an alternate receptacle for end-user consumption. The container is generally a single-use, single-serving container such as a capsule or packet.

A container processing subsystem 14 for use with the said capsule will initially be described, an example of which is shown in FIG. 1A. The container processing subsystem 14 comprises an extraction unit 26 operable to move between a capsule receiving position and a capsule extraction position. When moving from the capsule extraction position to the capsule receiving position the extraction unit 26 may be moved through or to a capsule ejection position, wherein a spent capsule can be ejected therefrom. The extraction unit 26 receives fluid from the fluid supply 12. The extraction unit 26 typically comprises: an injection head 28; a capsule holder 30; a capsule holder loading system 32; a capsule insertion channel 34A; a capsule ejection channel or port 34B, which are described sequentially.

The injection head 28 is configured to inject fluid into a cavity of the capsule 6 when held by the capsule holder 30, and to this end has mounted thereto an injector, which has a nozzle that is in fluid communication with the outlet of the fluid supply 12.

The capsule holder 30 is configured to hold the capsule 6 during extraction and to this end it is operatively linked to the injection head 28. The capsule holder 30 is operable to move to implement the said capsule receiving position and capsule extraction position: with the capsule holder in the capsule receiving position a capsule 6 can be supplied to the capsule holder 30 from the capsule insertion channel 34A; with the capsule holder 30 in the capsule extraction position a supplied capsule 6 is held by the holder 30, the injection head 28 can inject fluid into the cavity of the held capsule, and one or more ingredients can be extracted therefrom. When moving the capsule holder 30 from the capsule extraction position to the capsule receiving position, the capsule holder 30 can be moved through or to the said capsule ejection position, wherein a spent capsule 6 can be ejected from the capsule holder 30 via the capsule ejection channel or port 34B.

The capsule holder loading system 32 is operable to drive the capsule holder 30 between the capsule receiving position and the capsule extraction position.

The aforedescribed extraction unit 26 is generally a pressurised extraction unit, e.g. the container is hydraulically sealed and subject to 5-20 bar during brewing. Generally the pump is an induction pump. The extraction unit may alternatively operate by centrifugation as disclosed in EP 2594171 A1, which is incorporated herein by reference.

The container processing subsystem 14 may alternatively or additionally comprise a dissolution unit configured as disclosed in EP 1472156 and in EP 1784344, which are incorporated herein by reference.

In the embodiment of the container 6 comprising a packet the container processing subsystem 14 comprises an extraction and/or dissolution unit operable to receive the packet and to inject, at an inlet thereof, fluid from the fluid supply 12. The injected fluid mixes with material within the packet to at least partially prepare the beverage, which exits the packet via an outlet thereof. The container processing subsystem 14 comprises: a support mechanism to receive an unused packet and eject a spent packet; an injector configured to supply fluid to the packet from the outlet of the fluid supply. Further detail is provided in WO 2014/125123, which is incorporated herein by reference.

Figure 1B:
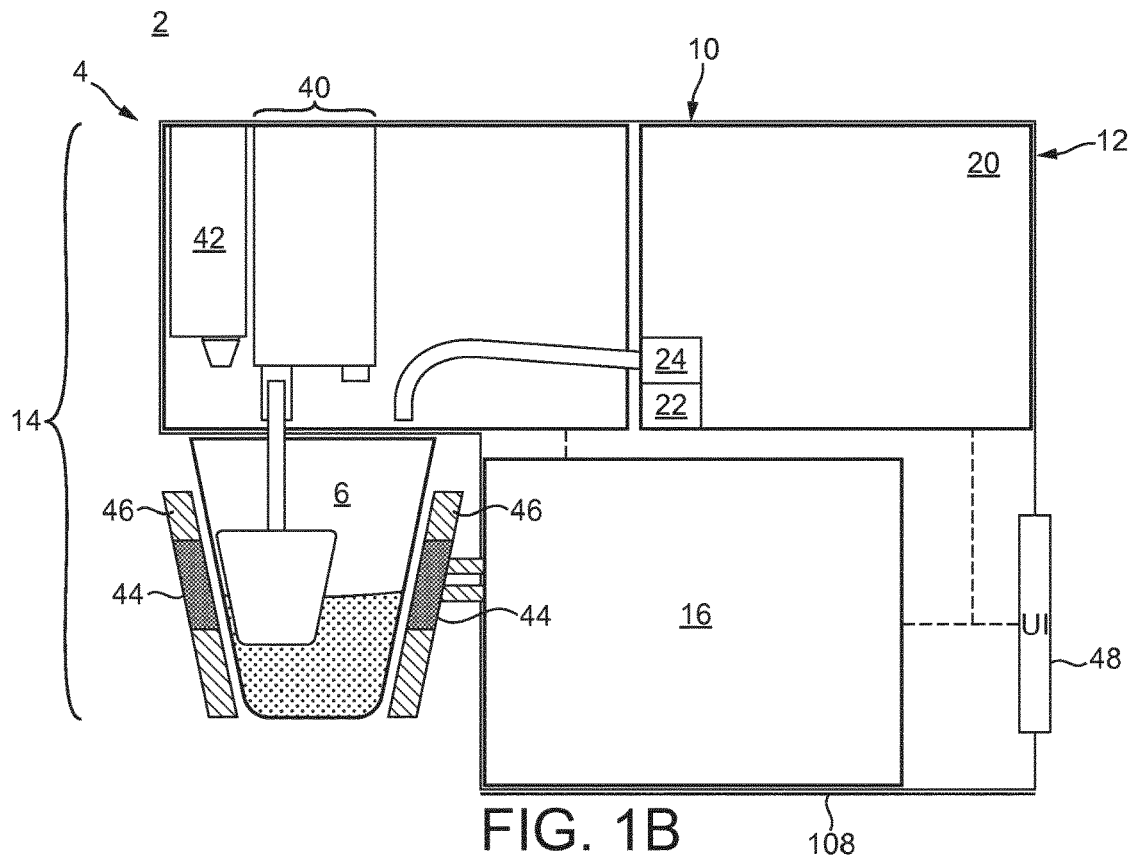

Container Processing Subsystem for Preparation of Foodstuff/Beverage in Container for End User Consumption According to a further embodiment, an example of which is shown in FIG. 1B, the container processing subsystem 14 is generally operable to prepare material stored in a container 6 that is a receptacle, such as a cup, pot or other suitable receptacle configured to hold approximately 150-350 ml of prepared product. Herein the container processing subsystem 14 comprises a mixing unit, which comprises: an agitator unit 40; an optional auxiliary product unit 42; a thermal exchanger 44; and a receptacle support 46, which will be described sequentially.

The agitator unit 40 is operable to agitate material within the receptacle for at least partial preparation thereof. The agitator unit may comprise any suitable mixing arrangement, e.g. a: planetary mixer; spiral mixer; vertical cut mixer. Typically the agitator unit 40 comprises: an implement for mixing having a mixing head for contact with the material; and a drive unit, such as an electric motor or solenoid, to drive the mixing implement. In a preferred example of a planetary mixer the mixing head comprises an agitator that rotates with a radial angular velocity W1 on an offset shaft that rotates with gyration angular velocity W2, such an arrangement is disclosed in PCT/EP13/072692, which is incorporated herein by reference.

The auxiliary product unit 42 is operable to supply an auxiliary product, such as a topping, to the container 6. The auxiliary product unit 42 for example comprises: a reservoir to store said product; an electrically operated dispensing system to effect the dispensing of said product from the reservoir. Alternatively or additionally, the auxiliary production unit comprises a dilution and/or an extraction unit as described above to effect the dispensing from said auxiliary product from a container 6 such as a packet or a capsule.

The thermal exchanger 44 is operable to transfer and/or extract thermal energy from the container 6. In an example of transfer of thermal energy it may comprise a heater such as thermoblock. In an example of extraction of thermal energy it may comprise heat pump such as a refrigeration-type cycle heat pump.

The receptacle support 46 is operable to support the container 6 during a preparation process such that the container remains stationary during agitation of the material therein by the agitator unit 40. The receptacle support 46 preferably is thermally associated with the thermal exchanger 44 such that transfer of thermal energy can occur with a supported receptacle.

In a variant of the above, the container processing subsystem 14 further comprises a dispensing mechanism for receiving a container 6 (such as a packet or capsule) and dispensing the associated material into the receptacle, where it is prepared. Such an example is disclosed in EP 14167344 A, which is incorporated herein by reference. In a particular embodiment with this configuration the container may be a partially collapsible container, whereby the container is collapsible to dispense material stored therein Such an example is disclosed in EP 15195547 A, which is incorporated herein by reference. In particular a collapsible portion of the container comprises a geometric configuration and/or portion of weakening such that said portion collapses in preference to a retaining portion upon the application of axial load through both portions. In such an embodiment the container processing subsystem 14 comprises a mechanical actuation device configured to apply an axial load to collapse said container, an example of which is provided in the reference application.

Control Subsystem

Figure 2A:
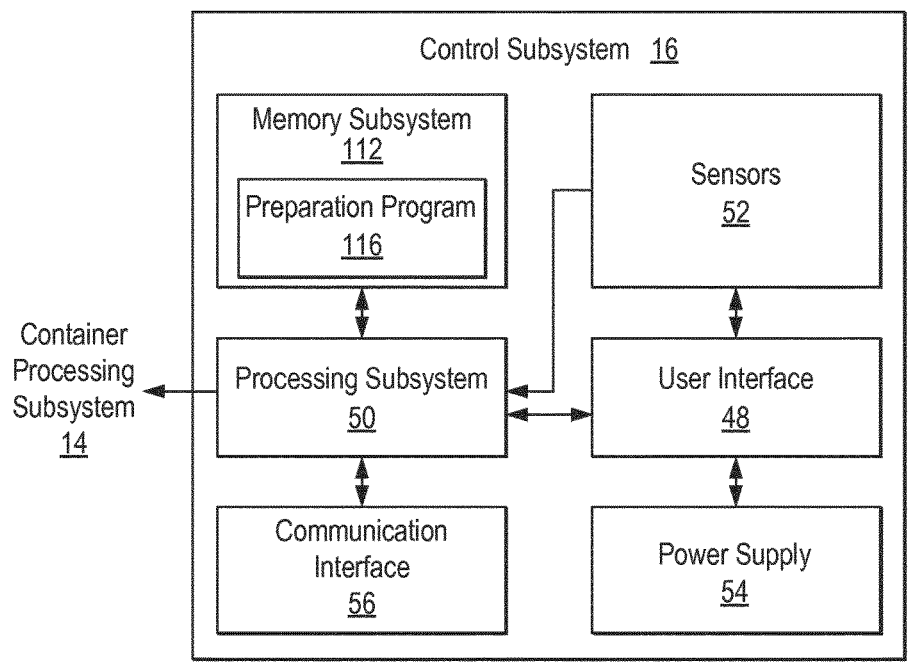
FIG. 2 is a block diagram illustrating a control subsystem and code processing subsystem for the preparation machine of FIG. 1 according to an embodiment of the present disclosure.
Figure 2B:
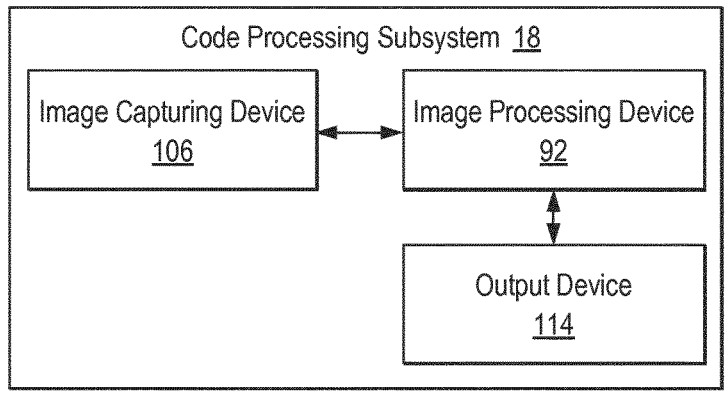

The control subsystem 16, an embodiment of which is illustrated in FIG. 2, is operable to control the container processing subsystem 14 to prepare the beverage/foodstuff. The control subsystem 16 typically comprises: a user interface 48; a processing subsystem 50; optional sensors 52; a power supply 54, optional communication interface 56, which are described sequentially.

The user interface 48 comprises hardware to enable an end user to interface with the processing subsystem 50 and hence is operatively connected thereto. More particularly: the user interface 48 receives commands from a user; a user interface signal transfers the said commands to the processing subsystem 50 as an input. The commands may, for example, be an instruction to execute a preparation process. The hardware of the user interface 48 may comprise any suitable device(s), for example, the hardware comprises one or more of the following: buttons, such as a joystick button or press button; joystick; LEDs; graphic or character LDCs; graphical screen with touch sensing and/or screen edge buttons.

Optional sensors 52 are operatively connected to the processing subsystem 50 to provide an input for monitoring said process. The sensors 52 typically comprise one or more of the following: fluid temperature sensors; fluid level sensors; position sensors e.g. for sensing a position of the extraction unit 26; flow rate and/or volume sensors.

The processing subsystem 50 (which may be referred to as a processor) is generally operable to: receive an input, i.e. said commands from the user interface 48 and/or from the sensors 52 and/or preparation information decoded by the code processing subsystem 18, as explained further below; process the input according to program code stored on a memory subsystem (or programmed logic); provide an output, which is generally the said preparation process. The process may be executed with open-loop control, or more preferably with closed-loop control using the input signal from the sensors 52 as feedback. The processing subsystem 50 generally comprises memory, input and output system components, which are arranged as an integrated circuit, typically as a microprocessor or a microcontroller. The processing subsystem 50 may comprise other suitable integrated circuits, such as: an ASIC; a programmable logic device such as an FPGA; an analogue integrated circuit such as a controller. The processing subsystem 50 may also comprise one or more of the aforementioned integrated circuits, i.e. multiple processors.

The processing subsystem 50 generally comprises or is in communication with a memory subsystem 112 (which may be referred to as a memory unit) for storage of the program code and optionally data. The memory subsystem 112 typically comprises: a non-volatile memory e.g. EPROM, EEPROM or Flash for program code and operating parameter storage; volatile memory (RAM) for data storage. The program code typically comprises a preparation program 116 executable to effect a preparation process. The memory subsystem may comprise separate and/or integrated (e.g. on a die of the processor) memory.

The power supply 54 is operable to supply electrical energy to the processing subsystem 50, container processing subsystem 14, and the fluid supply 12 as will be discussed. The power supply 54 may comprise various means, such as a battery or a unit to receive and condition a mains electrical supply.

The communication interface 56 is for data communication between the preparation machine 4 and another device/system, typically a server system. The communication interface 56 can be used to supply and/or receive information related to the preparation process, such as container consumption information and/or preparation process information. The communication interface 56 can be configured for cabled media or wireless media or a combination thereof, e.g.: a wired connection, such as RS-232, USB, $I^2C$, Ethernet defined by IEEE 802.3; a wireless connection, such as wireless LAN (e.g. IEEE 802.11) or near field communication (NFC) or a cellular system such as GPRS or GSM. The communication interface 56 is operatively connected to the processing subsystem 50. Generally the communication interface comprises a separate processing unit (examples of which are provided above) to control communication hardware (e.g. an antenna) to interface with the maser processing subsystem 50. However, less complex configurations can be used e.g. a simple wired connection for serial communication directly with the processing subsystem 50.

Code Processing Subsystem

The code processing subsystem 18 is operable: to obtain an image of a code on the container 6; to process said image to decode the encoded information including for example preparation information. The code processing subsystem 18 comprises an: image capturing device 106; image processing device 92; output device 114, which are described sequentially.

The image capturing device 106 is operable to capture a digital image of the code and to transfer, as digital data, said image to the image processing device 92. To enable the scale of the digital image to be determined: the image capturing device 106 is preferably arranged a predetermined distance away from the code when obtaining the digital image; in an example wherein the image capturing device 106 comprises a lens the magnification of the lens is preferably stored on a memory of the image processing device 92. The image capturing device 106 comprises any suitable optical device for capturing a digital image consisting of the latter discussed micro-unit code composition, The code forming a micro-unit composition, the image capturing device may have very small dimensions, for example in the magnitude of a few millimetres or less, for example less than 2 mm in length, width and thickness, thereby facilitating its integration in a foodstuff/preparation machine 4, for example in the container processing subsystem 14. Such image capturing devices are furthermore mechanically simple and reliable pieces of equipment that will not impair the machine's overall functional reliability. Examples of suitable reliable optical devices are: Sonix SN9S102; Snap Sensor S2 imager; an oversampled binary image sensor.

The image processing device 92 is operatively connected to the image capturing device 106 and is operable to process said digital data to decode information, in particular preparation information encoded therein. Processing of the digital data is discussed in the following. The image processing device 92 may comprise a processor such as a microcontroller or an ASIC. It may alternatively comprise the aforesaid processing subsystem 50, in such an embodiment it will be appreciated that the output device is integrated in the processing subsystem 50. For the said processing the image processing device 92 typically comprises a code processing program. An example of a suitable image processing device is the Texas Instruments TMS320C5517.

The output device 114 is operatively connected to the image processing device 92 and is operable to output digital data that comprises the decoded preparation information to the processing subsystem 50, e.g. by means of a serial interface.

Container

The container 6 may comprise, depending on the embodiment of the container processing subsystem 14, a: receptacle comprising material for preparation and end-user consumption therefrom; a capsule or packet comprising material for preparation therefrom. The container 6 may be formed from various materials, such as metal or plastic or a combination thereof. In general the material is selected such that it is: food-safe; it can withstand the pressure and/or temperature of the preparation process. Suitable examples of containers are provided following.

The container 6 when not in packet form generally comprises: a body portion 58 defining a cavity for the storage of a dosage of a material; a lid portion 60 for closing the cavity; a flange portion 62 for connection of the body portion and flange portion, the flange portion generally being arranged distal a base of the cavity. The body portion may comprise various shapes, such as a disk, frusto-conical or rectangular cross-sectioned. Accordingly, it will be appreciated that the capsule 6 may take various forms, an example of which is provided in FIG. 3A, which may generically extend to a receptacle or capsule as defined herein. The container 6 may be distinguished as a receptacle for end-user consumption therefrom when configured with an internal volume of 150-350 ml and preferably a diameter of 6-10 cm and axial length of 4-8 cm. In a similar fashion a capsule for extraction may be distinguished when configured with an internal volume of less than 100 or 50 ml and preferably a diameter of 2-5 cm and axial length of 2-4 cm. The container 6 in collapsible configuration may comprise an internal volume of 5 ml-250 ml. In embodiments, the container's cavity may be divided in a plurality of compartments, for example two, three or more compartments, each compartment containing a material possibly different from the material contained in the other compartments. The different materials of the various compartments may for example be processed simultaneously or sequentially by the container processing subsystem 14. Examples of such containers and their processing by an appropriate container processing subsystem are for example described in WO 2007/054479 A1, WO 2014/057094 A1 and unpublished application EP 17151656.0, which are all incorporated herein by reference.

Figure 3A:
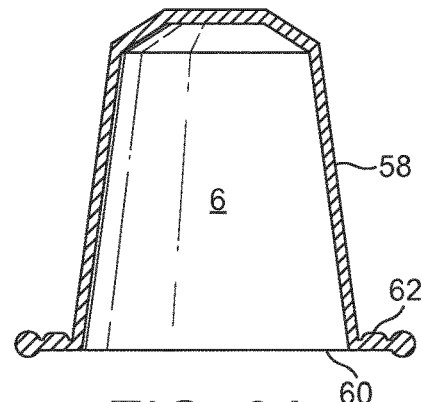
FIG. 3 is diagrammatic drawing illustrating containers for the preparation machine of FIG. 1 according to embodiments of the present disclosure.
Figure 3B:
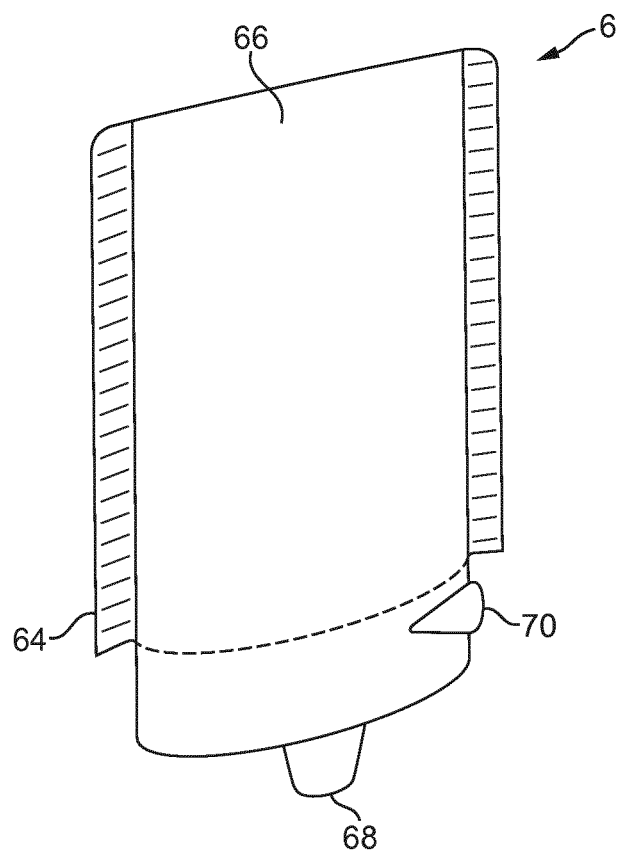

The container 6 when in packet form as shown in FIG. 3B generally comprises: an arrangement of sheet material 64 (such as one or more sheets joined at their periphery) defining an internal volume 66 for the storage of a dosage of a material; an inlet 68 for inflow of fluid into the internal volume 66; an outlet 70 for outflow of fluid and material from the internal volume. Typically the inlet 68 and outlet 70 are arranged on a body of an attachment (not shown), which is attached to the sheet material. The sheet material may be formed from various materials, such as metal foil or plastic or a combination thereof. Typically the internal volume 66 may be 150-350 ml or 200-300 ml or 50-150 depending on the application. In embodiments, the internal volume of the container may be divided in a plurality of compartments, for example two or three compartments, each compartment containing a material possibly different from the material contained in the other compartments. The different material of the various compartments may for example be processed simultaneously or sequentially by an appropriate container processing subsystem 14.

Information Encoded by Code

A code 74 of the container 6 encodes preparation information, which generally comprises information related to the associated preparation process. Depending on the embodiment of the container processing subsystem 14 said information may encode one or more parameters, which may comprise one or more of a: fluid pressure; fluid temperature (at container inlet and/or outlet to receptacle); fluid mass/volumetric flow rate; fluid volume; phase identifier, for when a preparation process is split into a series of phases, whereby each phase comprises a set of one of more of the aforesaid parameters, (typically there are 4-10 phases); phase duration (e.g. a duration for applying the parameters of a phase); recipe and/or container and/or compartment identifier, for when a recipe requires processing material contained in two or more containers and/or container compartments; container geometric parameters, such as shape/volume/number of different ingredient compartments; other container parameters e.g. a container identifier, which may for example be used to monitor container consumption for the purpose of container re-ordering, an expiry date, a recipe identifier, which may be used to lookup a recipe stored on the memory of the beverage machine for use with the container.

Specifically in respect of a preparation machine 4 such as the one illustrated in FIG. 1A said encoded parameters may comprise any one or more of a: pressure; temperature; fluid volume; fluid flow rate; time of a particular phase of preparation for which the aforesaid one or more parameters are applied for; phase identifier, e.g. an alphanumeric identifier, to identify which of a plurality of phases the aforesaid one or more parameters relate; recipe identifier; pre-wetting time, which is the amount of time the material of the container may be soaked for during an initial preparation phase; pre-wetting volume, which is the amount of fluid volume applied during said phase.

Specifically in respect of a preparation machine 4 such as the one illustrated in FIG. 1B said encoded parameters may comprise one or more of a: percentage cooling or heating power to apply (e.g. the power applied by the thermal exchanger 44); torque applied by the agitator unit 40; one or more angular velocities (e.g. a gyration and radial angular velocities W1, W2); container temperature (e.g. the temperature set by the thermal exchanger 44); time of a particular phase of preparation for which the aforesaid one or more parameters are applied for; phase identifier, e.g. an alphanumeric identifier, to identify which of a plurality of phases the aforesaid one or more parameters relate.

Arrangement of Code

The code is arranged on an exterior surface of the container 6 in any suitable position such that it can be processed by the code processing subsystem 18. In the afore-discussed example of a receptacle/capsule 6, as shown in FIG. 3A, the code can be arranged on any exterior surface thereof, e.g. the lid, body or flange portion. In the afore-discussed example of a packet 6, as shown in FIG. 3B, the code can be arranged on any exterior surface thereof, e.g. either or both sides of the packet, including the rim.

Figure 8A:
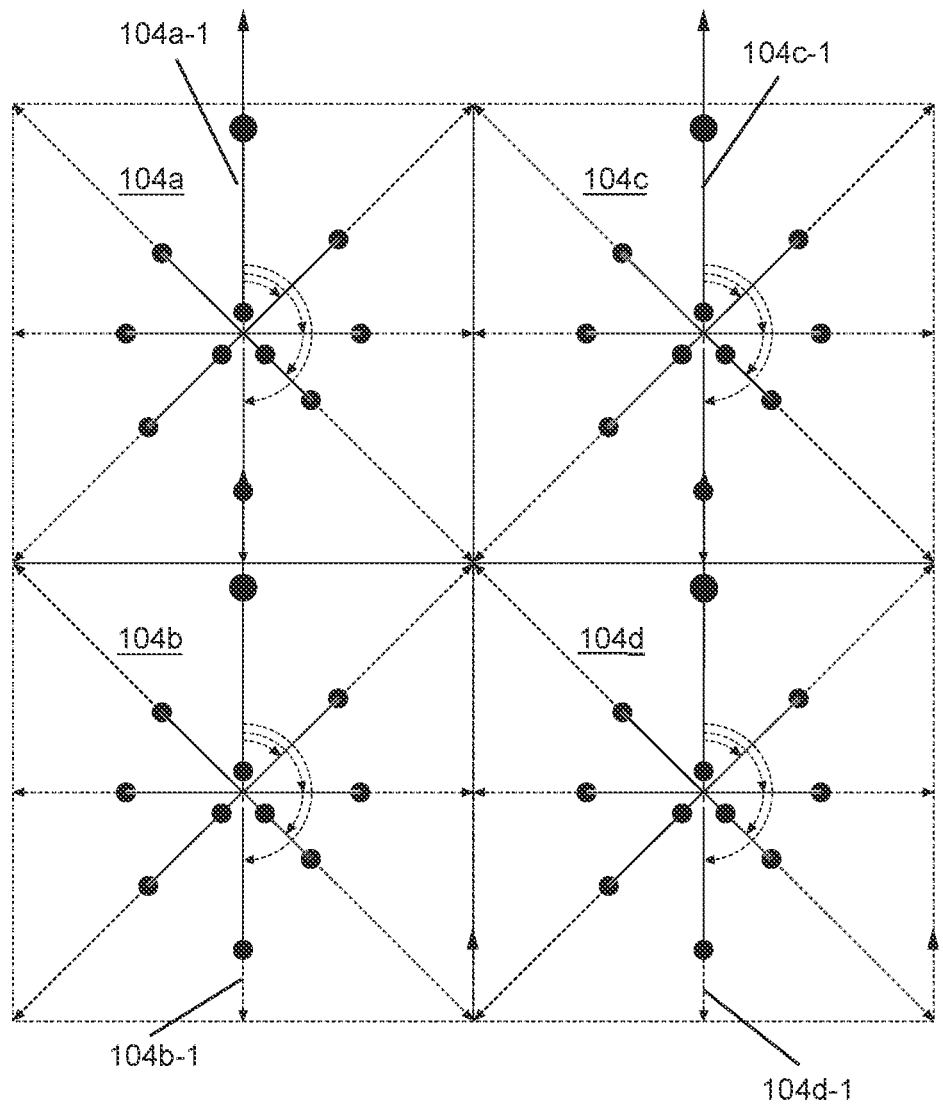
FIGS. 8A and 8B are plan views showing the code of FIG. 4B in a tessellating manner.
Figure 8B:
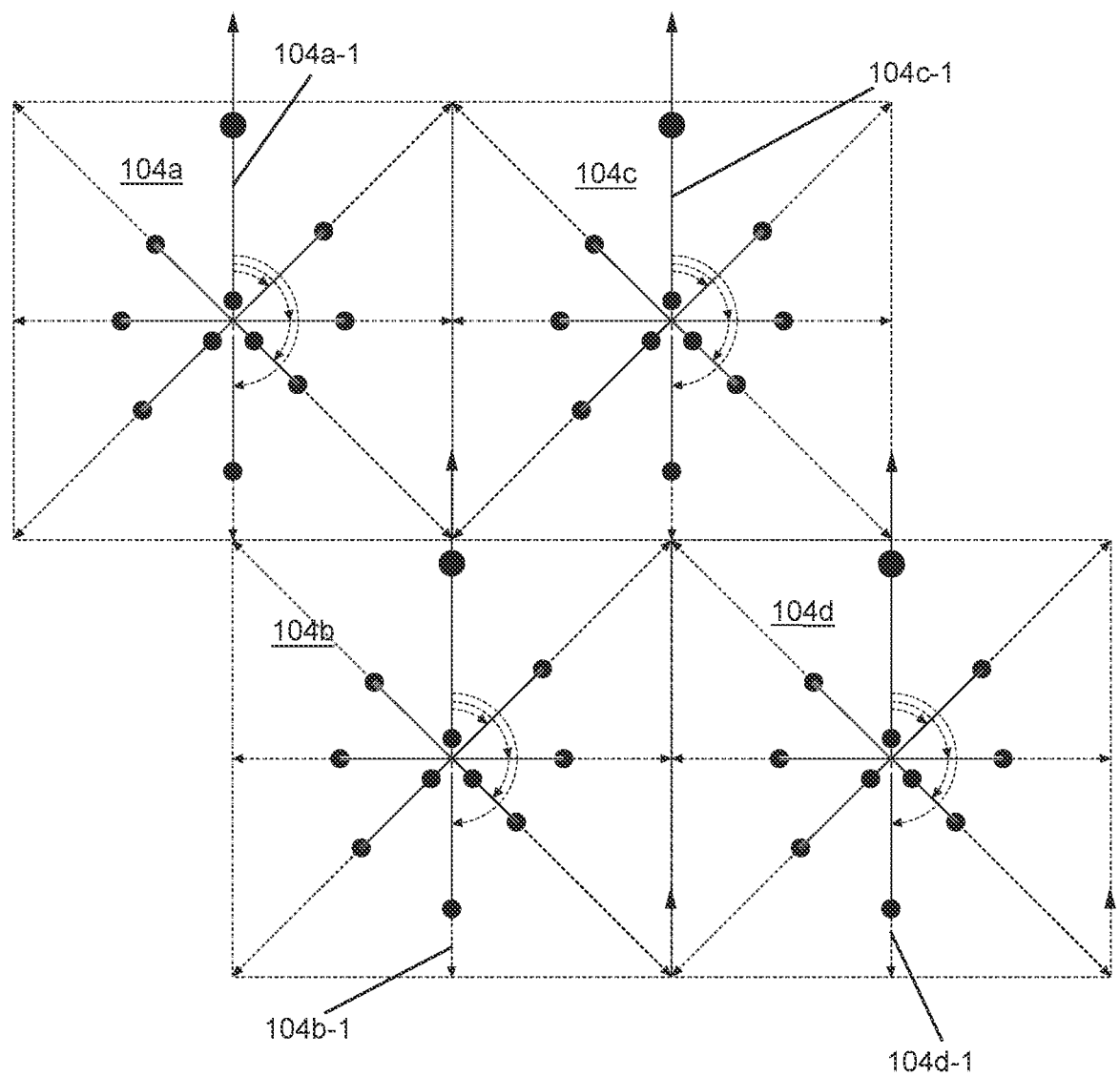

A plurality of codes can be formed on the container 6, e.g.: for read error checking; and/or with separate phases of a preparation process encoded by each code. In particular the planform of the code (as will be discussed) may comprise an at least partially tessellating shape, e.g. a rectangle such as a square, whereby the codes are formed on a container in an at least partially tessellating manner (e.g. a grid with adjacent columns aligned or with adjacent columns offset). FIGS. 8A and 8B illustrate non-limiting examples of such embodiments. For example. FIG. 8A shows a plurality of codes 104-1 through 104-4 in a grid with columns of vertically-adjacent planforms 104 aligned. Columns 104*a*-1 and 104*b*-1 of planforms 104*a* and 104*b* are aligned, as are columns 104*c*-1 and 104*d*-1 of neighboring planforms 104*c* and 104*d*. FIG. 8B shows a plurality of codes 104-1 through 104-4 in a grid with columns of vertically-adjacent planforms 104 offset. Columns 104*a*-1 and 104*b*-1 of planforms 104*a* and 104*b* are offset, as are columns 104*c*-1 and 104*d*-1 of neighboring planforms 104*c* and 104*d*.

Composition of Code

The code 74, and example of which is shown in FIG. 4, is configured to encode the preparation information in a manner for capturing by the image capturing device 106. More particularly, the code is formed of a plurality of units 76, preferably micro units, with a surround of a different colour: typically the units comprise a dark colour (e.g. one of the following: black, dark blue, purple, dark green) and the surround comprises a light colour (e.g. one of the following: white, light blue, yellow, light green) or the converse, such that there is sufficient contrast for the image processing device 92 to distinguish therebetween. The units 76 may have one or a combination of the following shapes: circular; triangular; polygon, in particular a quadrilateral such as square or parallelogram; other known suitable shape. It will be appreciated that due to formation error, (e.g. printing error), the aforesaid shape can be an approximation of the actual shape. The units 76 typically have a unit length of 50-200 μm (e.g. 60, 80, 100, 120, 150 μm). The unit length is a suitably defined distance of the unit, e.g.: for a circular shape the diameter; for a square a side length; for a polygon a diameter or distance between opposing vertices;

for a triangle a hypotenuse. The units 76 are preferably arranged with a precision of about 1 µm.

Whilst the code is referred to as comprising a plurality of units it will be appreciated that the units may alternatively be referred to as elements or markers.

Typically the units 76 are formed by: printing e.g. by means of an ink printer; embossing; engraving; other known means. As an example of printing, the ink may be conventional printer ink and the substrate may be: polyethylene terephthalate (PET); aluminium coated with a lacquer (as found on Nespresso™ Classic™ capsules) or other suitable substrate. As an example of embossing, the shape may be pressed into a plastically deformable substrate (such as the aforesaid aluminium coated with a lacquer) by a stamp. The costs of forming the code on a container 6 may thus be kept low by using conventional and inexpensive technologies (e.g. ink-jet, off-set, or laser printing), such that the costs of forming the code don't significantly impact the costs of production of the container 6.

The code comprises a planform 104, within which the units 76 are arranged. The planform may be circular, rectangular (as shown in FIG. 4), or polygonal. Typically the planform has a length (i.e. a diameter for a circular or polygonal planform and a side length for a square planform) of 600-1600 µm, or about 1100 µm, which will depend on the number of parameters encoded. The code 74 of the invention allows encoding several parameter values on a small surface, thereby allowing potentially encoding all parameters necessary for the completion of complex recipes by a beverage or foodstuff preparation machine according to the fourth embodiment of the invention. The code 74 for example allows encoding preparation information required for recipes comprising several processing phases using the foodstuff contained in one or more containers and/or container compartments.

The units 76 are organised into a: data portion 78 to encode the preparation information; and a reference portion 80 to provide a reference for the data portion 78, both of which are described in more detail following.

The reference portion 80 comprises a plurality of reference units 86, which define a reference point 88 and a reference line r extending from said point. The reference line r provides a reference direction for angular reference by the data portion 78 as will be discussed.

The data portion 78 comprises a data unit 82, for example exactly one data unit 82, which is arranged on an encoding line D. The encoding line D extends from the reference point 88 and is arranged at an angle α (which is generally any angle other than 0°) to the reference line r. The data unit 82 is arranged a distance d from the reference point 88 as a variable to at least partially encode a parameter of the preparation information. Generally the data unit is able to occupy any continuous distance d along the encoding line D from the reference point 88 as a variable to encode a parameter of the preparation information. In this respect a wider range of information may be encoded. The continuous encoding of a parameter is particular advantageous in encoding parameters which can have a large numerical range, e.g. torque and angular velocity. Alternatively, the data unit 82 can only occupy discrete positions only (i.e. one of a plurality of predetermined positions) along the encoding line D as a variable to encode the parameter.

Detailed Description of Code

Figure 4A:
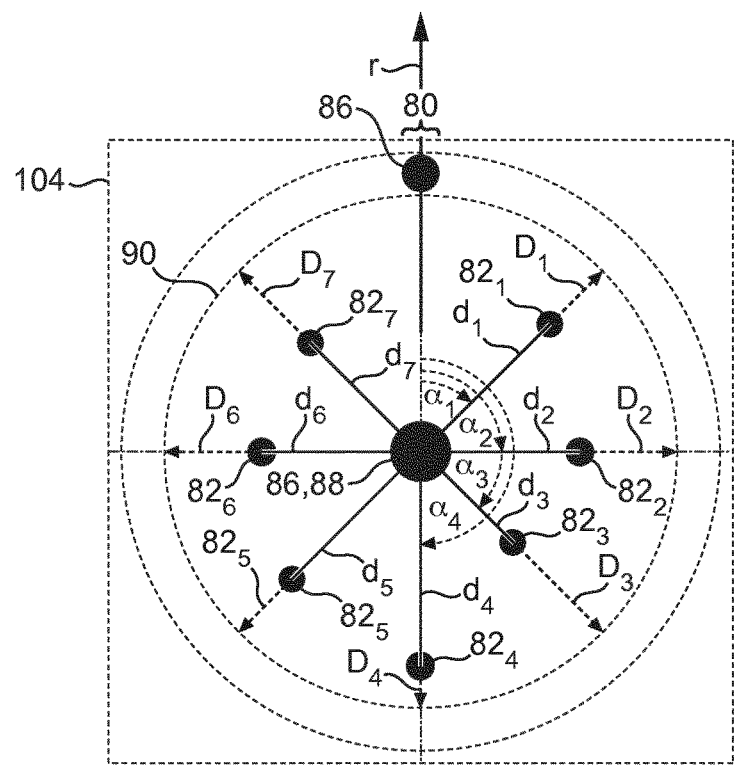
FIGS. 4-5 are plan views showing to scale codes for the containers of FIG. 3 according to embodiments of the present disclosure.

The code 74, an example of which is shown in FIG. 4A, comprise the aforesaid arrangement of the encoding line D and reference line r. Note in FIG. 4A (and those following) the: reference line r, encoding line D; planform 104; encoding area 90; and various other constructional lines, are shown for illustrative purposes only, that is to say they do not require physical formation as part of the code. Rather they can be defined virtually when an image of the code is processed as will be discussed. Preferably, only the reference units 86 and the data units 82 are physically formed, e.g. printed or embossed, on the container or code support.

Generally there are a plurality of encoding lines D, such as any number between 2-50, each of which extend radially from the reference point 88 and comprise a data unit 82 arranged at a distance d from said point as a variable to at least partially encode a parameter of the preparation information. In the example shown in FIG. 4A there are seven such lines. In particular the encoding lines D may be spaced at equally incremented angles α from the reference line r.

Numbering of the encoding lines D and associated: data units 82; distance d; angle α, herein is denoted by a numerical subscript, and increases sequentially from the reference line r in the clockwise direction as shown for the example in FIG. 4A.

The distance d is defined from the reference point 88 along the encoding line D to a position on the encoding line D which a centre of the data unit 82 is arranged on or arranged proximate thereto, e.g. at a position on the encoding line D which is intersected by a line through the centre of the data unit 82, whereby said line is orthogonal to the encoding line D.

The reference portion 80 comprises m reference units 86, (two are illustrated in FIG. 4A) arranged to define the linear reference line r and the reference point 88, wherein m numerically is at least two. In particular the reference line r extends through a plurality of points which are defined either by a reference unit or a by plurality of reference units as will be discussed.

Generally a reference line orientation identifier 118 defines the reference point. The orientation identifier enables convenient determination of the orientation of the reference line r and associated data portion 78, e.g. each encoding line D of the data portion 78 is a predetermined angle α (such as increments of 90° or 45° or 22.5°) to the reference line r about the reference point 88. In examples not comprising said orientation identifier the reference point may be identified as: a portion at the end of the reference line r, which can be defined by a plurality of same reference units; or by other means.

The orientation identifier 118 may comprise a single reference unit, an example of which is shown in FIG. 4A, whereby the aforesaid reference point 88 is generally at the centre of the reference unit. The orientation identifier may be identifiable as one or a combination of a different shape, colour, size from the other units that comprise the code. As illustrated, the reference unit for example comprises a different size to the other units of the code (e.g. it has a diameter of 120 µm and the other units are 60 µm. Advantageously it is convenient for a processor to determine an orientation of the reference line r.

Figure 9:
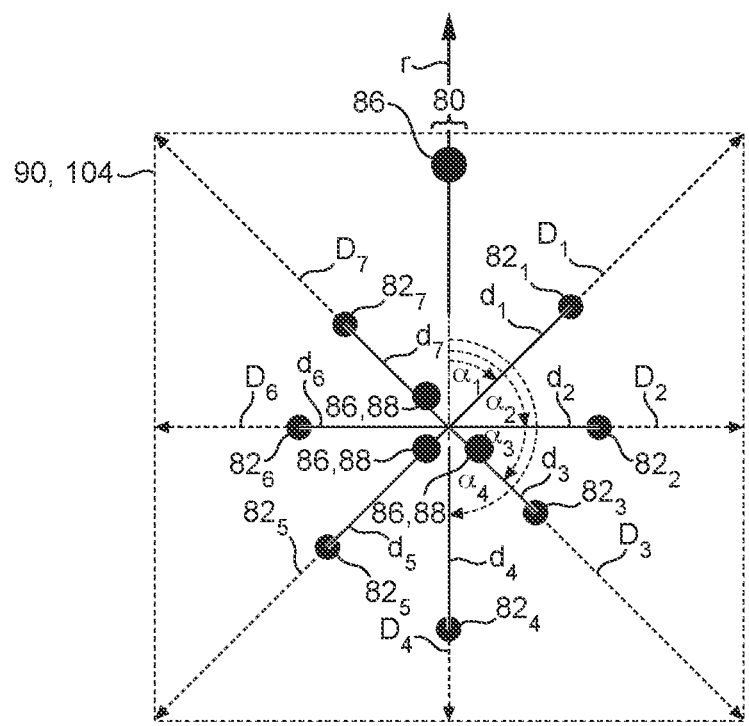
FIG. 9 illustrates a plan view of a further embodiment of a code for the container s of FIG. 3.

Preferably, the orientation identifier 118 comprises a plurality of reference units, whereby each reference unit of the plurality of reference units is the same (i.e. in shape, colour and size) as the other units of the code. In particular the reference units that comprise the reference unit orientation identifier are arranged with a configuration defining the aforesaid reference point 88. Said configuration generally comprises a 2 dimensional polygon with the reference units arranged at the vertices and said reference point at the centre, preferably with equal side lengths. The polygon may be one selected from a group comprising: a triangle; square;

pentagon; hexagon; heptagon; octagon. In the example shown in FIG. 4B the polygon is an equilateral triangle with three reference units arranged at its vertices and said reference point at its centre. In a preferred embodiment, the polygon is a right-angled triangle, wherein the reference units at the vertices of the triangle are located on a virtual circle centred on the reference point of the code. The virtual circle is preferably located outside an encoding area of the code, close to the centre of the annular encoding area. The reference line r for example extends from the reference point defined by the reference units, and its orientation is determined parallel to a specific side of the triangle, for example parallel to the upright portion of the "L" formed by the reference units as shown in FIG. 9. It is advantageous to have all of the units of the code the same since the complexity of processing the code is reduced. In particular, a computer program only has to determine the presence of a unit and its centre, as opposed to discriminated between different sizes, shapes and/or colours. Consequently a more cost effective processor can be utilised in the beverage or foodstuff preparation machine.

In embodiments, the reference line r is comprised of the orientation identifier 118 and a further reference unit 86. The centre of the further reference unit defines a point through which the reference line r extends. The further reference unit is identifiable by one or more of the following: its arrangement at a greater radial position from the orientation identifier 118 (i.e. from its aforesaid point) than the data units 82; its arrangement at a predetermined reserved radial position from the orientation identifier 88, whereby the data units are not arranged at said predetermined radial position; and it is distinct from the other units that comprise the code in terms of one of more of the following: shape, size, colour. The reference line r and its orientation can thus be determined by locating the orientation identifier 88 and a further reference unit 86.

The data portion 78 generally comprises an encoding area 90, which is defined by the encoding lines D, within the bounds of which the data units 82 are arranged. The encoding area is generally radially intersected by the reference line r. The encoding area 90 may be circular and as shown in FIG. 4A.

Figure 4B:
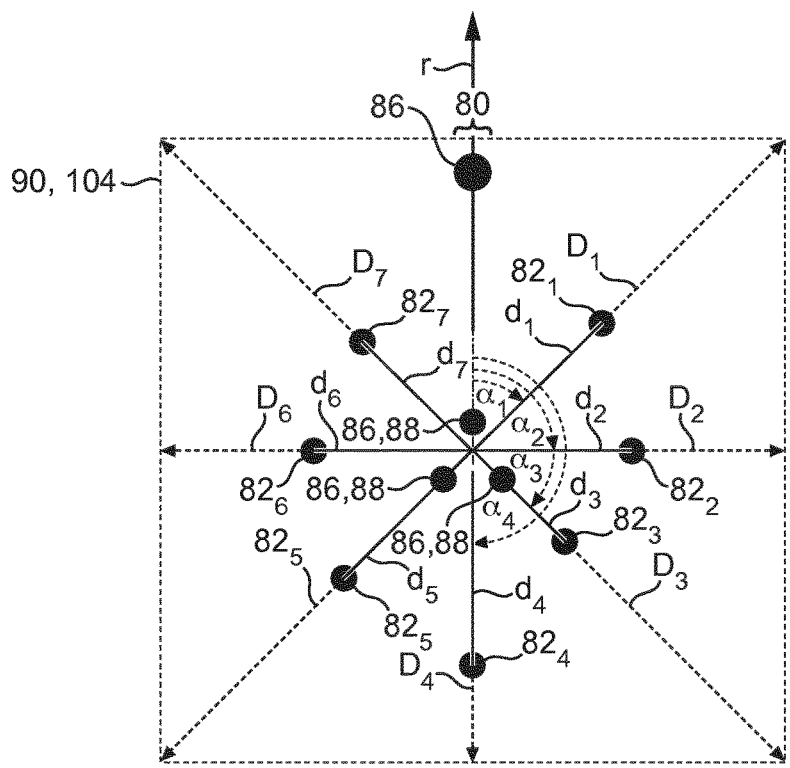

Alternatively the encoding area 90 may be rectangular, as shown in FIG. 4B, wherein the encoding lines D have different lengths and extend up to the vertices thereof. Such an arrangement is advantageous since for a rectangular planform 104 the majority of the area of the planform 104 is utilised to encode information, hence the code 74 has an optimized encoding density. Moreover, wherever possible, it is desirable to maximise the length of the encoding lines D within the planform 104 so that data is encoded with the greatest precision.

A rectangular planform 104 is desirable since a tessellating shape is particularly advantageous since a plurality of codes can be compactly repeated on the container, e.g.: for read error checking; and/or with separate phases of a preparation process encoded by each code.

More than one data unit 82 can be arranged along an encoding line D, e.g. so that multiple parameters are encoded on an encoding line D or so that each parameter has multiple values associated therewith, examples of which will be provided. A value of a parameter is encoded by the radial distance d of the data unit 82 from the reference point 88.

Generally a data unit 82 can be arranged on the associated encoding line D any position up to but not overlapping the or each reference unit of the orientation identifier 118.

Encoding of Metadata

Each data unit 82 optionally encodes metadata about an associated parameter. The metadata is generally encoded discretely, i.e. it can only assume certain values. Various examples of encoding the metadata are given following.

Figure 5A:
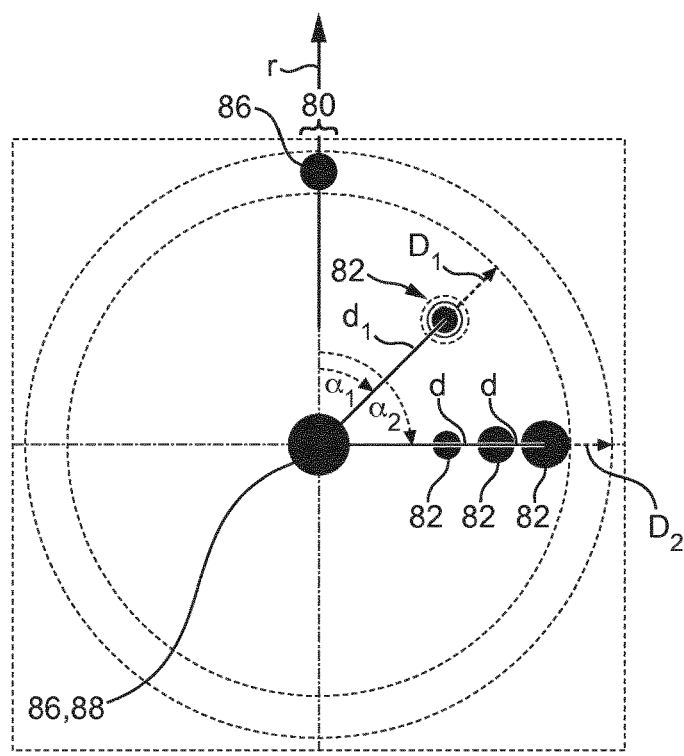

In a first embodiment, an example of which is illustrated in FIG. 5A, the metadata is encoded as a characteristic size (e.g. the size defined by the above-defined unit length or area) of the data unit 82, the size being identifiable as a variable by the image processing device 92. Particularly, the size may be one of a list of 2 or 3 or 4 particular sizes, e.g. selected from lengths of 60, 80, 100, 120 µm. In a particular example, which is best illustrated for the data unit 82 for the first encoding line $D_1$, the size of the data unit 82 may be one of three sizes. In a particular example, which is illustrated for the second encoding line $D_2$, there are three parameters encoded (hence three data units), the data unit 82 of each parameter being identifiable by the metadata of the three different sizes of the data units 82.

Figure 5B:
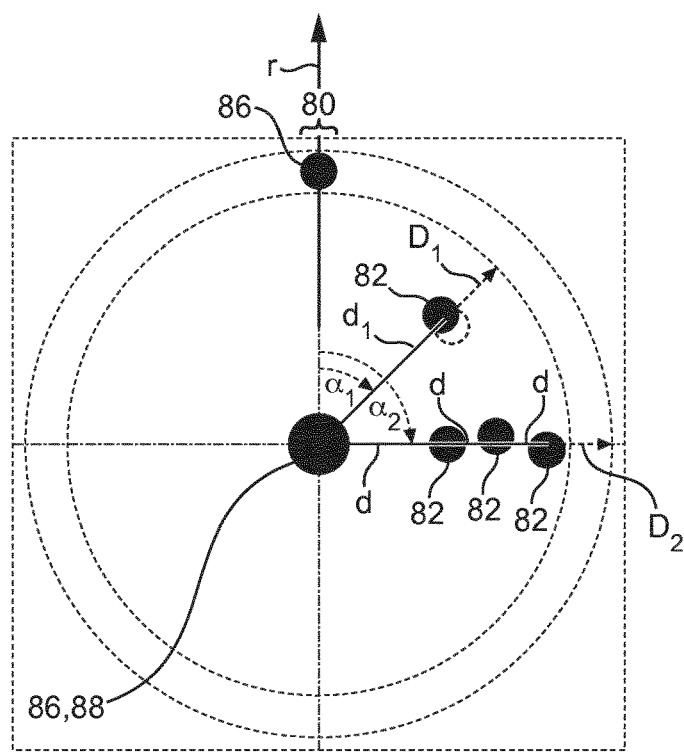

In a second embodiment, an example of which is illustrated in FIG. 5B, the metadata is encoded as a characteristic position of the data unit 82 with respect to an offset of said data unit 82 along an offset line that extends orthogonal to the encoding line D (i.e. an orthogonal distance from the encoding line D to the centre of the data unit 82). In spite of said offset the encoding line D still intersects the data unit 82. In particular: the data unit 82 may be offset in a first or second position with respect to the encoding line D to encode two values of the metadata; the data unit 82 may be offset in the first or second position or arranged in a third position on the encoding line D to encode three values of the metadata. The first and second position may be defined by a centre of the data unit 82 arranged a particular distance away from the encoding line D, e.g. at least 20 µm. The third position may be defined by a centre of the data unit 82 arranged less than a particular distance away from the encoding line D, e.g. less than 5 µm. In a particular example, which is illustrated for the first encoding line $D_1$, the data unit 82 may be in a first or second position to encode the metadata. In a particular example, which is illustrated for the second encoding line $D_2$, there are three parameters encoded (hence three data units), the data unit 82 of each parameter being identifiable by the metadata of the position of the data units 82.

Figure 5C:
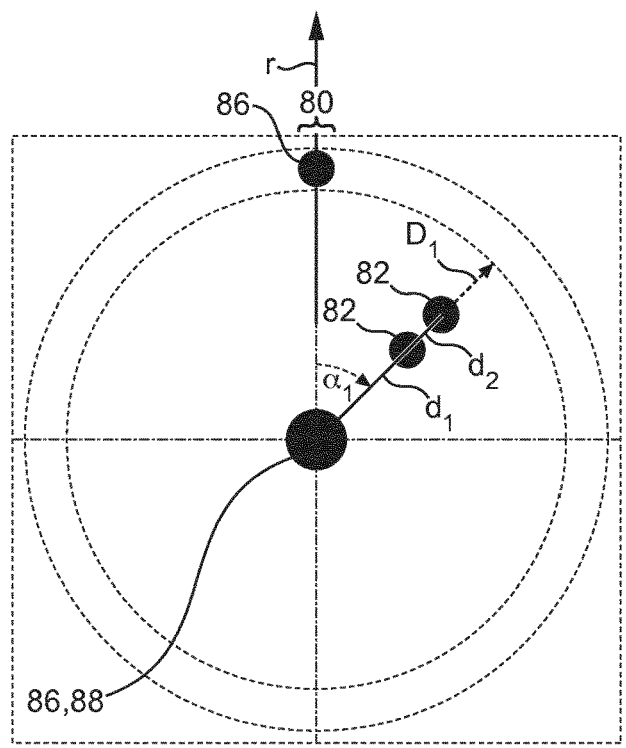

In a third embodiment, an example of which is illustrated in FIG. 5C, metadata is encoded as a plurality of data units 82 arranged along the same encoding line D, each with a different associated distance $d_n$. Advantageously an overall distance d can be determined with increased accuracy as a function (typically an average) of the distances $d_n$. In the illustrated example two data units 82 are shown wherein $d=0.5(d_1+d_2)$.

In a fourth embodiment (not shown) the metadata is encoded as a characteristic shape. For example the shape may be one of a list of: circular; triangular; polygon. In a fifth embodiment (not shown) the metadata is encoded as a characteristic colour. For example the colour may be one of a list of: red; green; blue, suitable for identification by an RGB image sensor.

The first-fifth embodiments may be suitably combined, e.g. an encoded parameter may have metadata encoded with a combination of the first and second embodiment.

Figure 5D:
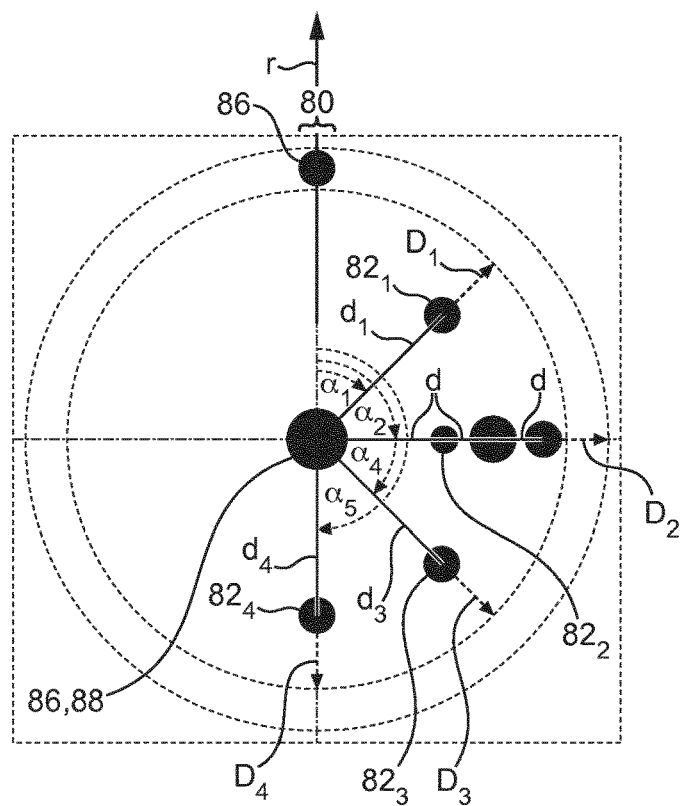

A specific example of the code 74 for use with the second embodiment container processing subsystem 14, is illustrated in FIG. 5D, wherein: the first $D_1$, third $D_3$ and fourth $D_4$ encoding lines have a data unit 82 that encodes a parameter without any metadata the; second encoding line $D_2$ has three data units 82, each encoding a parameter, the parameter having metadata encoded according to a combination of the first and second embodiment (i.e. 3 values for the size of the unit and 3 values for the position of the unit, hence a total of 9 possible values of the metadata).

In particular: the first encoding line $D_1$ encodes a percentage cooling power to apply; the third and fourth encoding line $D_3$, $D_4$ encode either of the radial angular velocity W1 and the gyration angular velocity W2; the second encoding line $D_2$ encodes time, temperature, torque as the respective small, medium and large data units in particular positions, whereby these parameters represent triggers such that when a condition set by one of them is achieved then the phase encoded by the code 74 is compete.

Encoding of Phases

The code 74 may encode a plurality of phases comprising a preparation process. Typically any number of phases between 2-16 are encoded. The parameters encoded in a phase can be any combination of the aforesaid parameters suitable for the particular container processing subsystem 14, e.g. for a first embodiment container processing subsystem 14 the parameters may comprise: temperature; volume of flow and/or flow rate; and time. As an example of phase encoding (not shown) the arrangement of the encoding lines in FIG. 5D, which are arranged in the first and second quadrant can be repeated in the third and fourth quadrant to encode 2 phases.

Method of Processing Code

The code processing subsystem 18 processes the code 74 to determine the preparation information by: obtaining by means of the image capturing device 106 a digital image of the code; processing by means of the image processing device 92 digital data of the digital image to decode the preparation information; outputting by means of the output device 114 said decoded preparation information.

Processing of the digital data comprises: locating the units 82, 86 in the code; identifying the reference units 86 and determining therefrom a reference point and/or a reference line r; determining for each data unit 82 a distance d along the associated encoding line D from the reference point 88; converting the determined distance d into an actual value of a parameter $V_p$, each of which will be described sequentially.

Locating the units 82, 86 in the code is generally achieved by conversion of the pixels represented in the digital data to a one-bit bi-tonal black and white image, i.e. a binary image, whereby the associated conversion parameters are set to distinguish the units from their surrounding base level. Alternatively an oversampled binary image sensor may be used as the image capturing device 106 to provide the binary image. Locations of the centre of units may be determined by a feature extraction technique such as circle Hough Transform. Different sized units may be identified by pixel integration.

Identification of the reference units 86 and determining therefrom a reference point and/or a reference line r is generally achieved by identification of one or a combination of: units that have a linear arrangement; units that are a predetermined and/or greatest distance apart; units that are a particular shape or size or colour; units with a particular configuration. Generally an orientation identifier 118 of the reference line r is initially determined by identifying one or a combination of: a reference unit 86 that is a different shape or size or colour from the other reference units; a plurality of reference units with a specific configuration. Thereafter the reference line r may be determined by identifying a reference unit 86 with a predetermined/greatest distance therefrom and/or by identifying a specific alignment of reference units. A specific configuration may be identified by searching for said configuration, e.g. units which have a polygon arrangement, from which the reference point can be extracted, e.g. by finding a centre or another specific geometric point of said configuration.

Determining the reference point and the reference line r when processing the code allows determining the orientation of the code in the captured image prior to decoding the information. The image of the code may thus be captured in any direction without affecting the decoding accuracy. The container bearing the code thus doesn't need to be aligned in a specific orientation relative to the image capturing device, thereby simplifying the construction of the machine and the processing of the container in the machine. In that sense, it is not necessary to require the consumer to orientate the container before inserting it into the food or beverage preparation device. Usage of a container bearing a code according to the invention is thus user-friendly.

Determining for each data unit 82 a distance d along the associated encoding line D from the reference point 88 is generally achieved by determining the distance from the centre of a data unit 82 (or in the event metadata is encoded via the second embodiment the position where a line from the centre of the data unit intersects orthogonally the encoding line D) to reference point 88 (e.g. its periphery or centre). The determined distance d can be corrected using the magnification and/or distance of the image capturing device 106 away from the code 74 when the image was captured.

Converting the determined distance d into an actual value of a parameter $V_p$ may comprise using stored information (e.g. information stored on the memory subsystem 112) which defines a relationship between the parameter and distance d. This step may be performed at the image processing device 92 or processing subsystem 50. The relationship may be linear, e.g. $V_p \propto ad$. Alternatively it may be non-linear. A non-linear relationship may comprise a logarithmic relationship, e.g. $V_p \propto \log(d)$ or an exponential relationship, e.g. $V_p \propto e^d$. Such a relationship is particular advantageous when the accuracy of a parameter is important at low values and less important at high values or the converse e.g. for the second embodiment of the container processing subsystem 14 the accuracy of the angular velocities W1, W2 of the mixing unit are more important at a low angular velocity than at a high angular velocity, hence an exponential relationship is preferable.

Determining for each data unit 82 a distance d along the associated encoding line D may optionally comprise determining the length and orientation of the encoding lines D. For example one or a combination of the following may be determined: whether the data is encoded with an encoding area 90 that is circular or rectangular; the angle α separating the lines. The aforesaid may be encoded as part of the code, e.g. by the first reference line D, or by stored information (i.e. information stored on the memory subsystem 112).

The aforesaid metadata about the parameter can be determined depending on the embodiment of encoding, e.g.: in the first embodiment by determining for the associated data unit 82 a unit length by feature extraction or overall area by pixel integration; in the second embodiment by determining for the associated data unit 82 an offset to the encoding line D by feature extraction; in the third and fourth embodiment by determining the centre of the associated data units by feature extraction.

According to embodiments of the code, each data unit 82 encoding a distance d along a corresponding encoding line D encodes the value $V_p$ of another parameter required for the preparation of the desired foodstuff/beverage. For example, each data unit 82 encoding a distance d along an encoding line D encodes the value of a processing parameter such as a processing temperature, a processing time, a liquid volume, a mixing speed, etc. for a particular preparation phase, different from the processing parameters whose values are encoded by the other such data units 82 of the code.

Machine and Container Attachments

Figure 6:
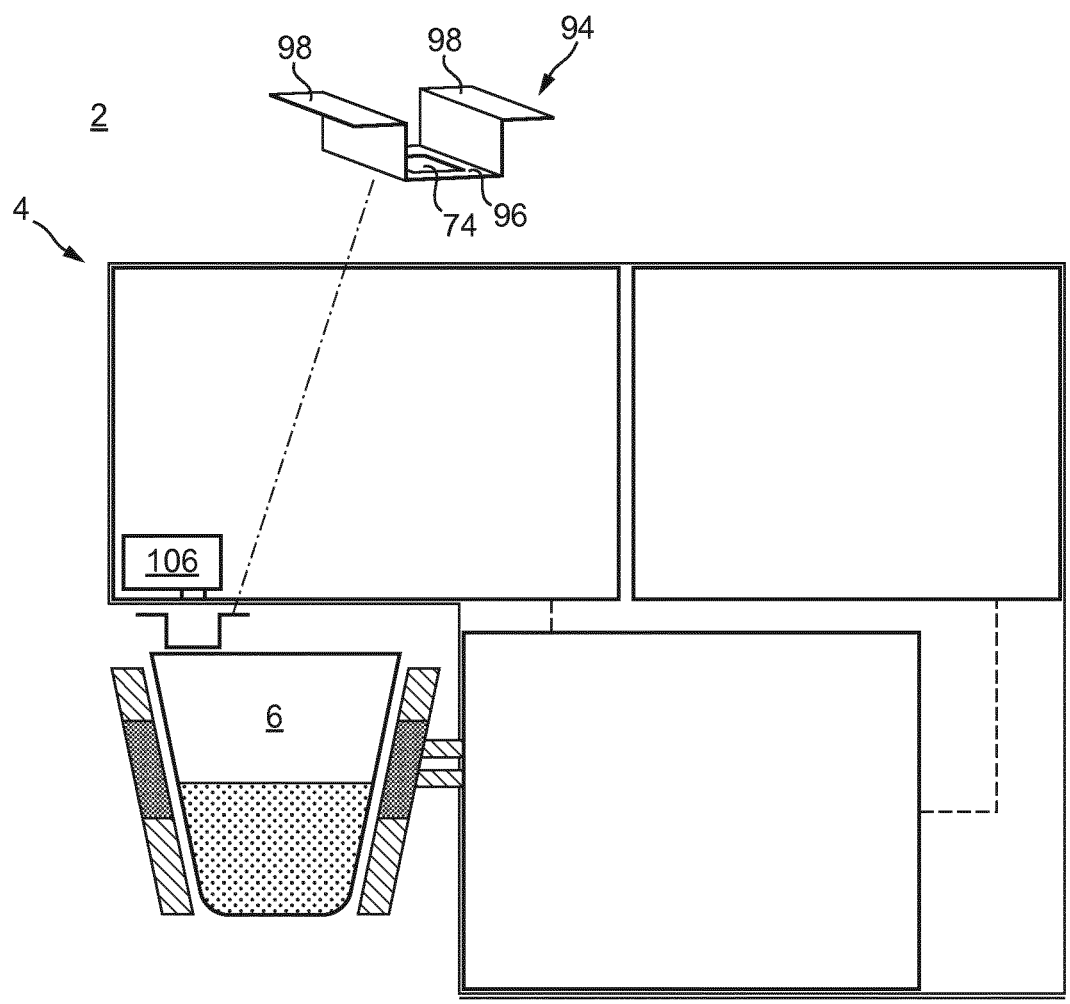
FIG. 6-7 are diagrammatic drawings illustrating attachments for the system of FIG. 1 according to embodiments of the present disclosure.

An attachment 94 may comprise the afore-described code 74 arranged on a surface thereof, the attachment 94 configured for attachment to the afore-described beverage or foodstuff preparation machine 4. The attachment, an example which is illustrated in FIG. 6, comprises: a carrier 96 for carrying the code 74; an attachment member 98 for attachment of the carrier 96 to the machine 4 between an image capturing device 106 of said machine 4 and a container 6 received by said machine 4 and proximate said container. In this way an image of the code 74 can be captured by the image capturing device 106 as if it were attached to the container 6. Examples of suitable attachment members comprise: extensions attached to said carrier comprising an adhesive strip (as illustrated); a mechanical fastener such as a clip, bolt or bracket. The use of such an attachment 94 is particularly useful if: only one type of container 6 is used on the machine 4; a clean or other maintenance related operation is required.

Figure 7:
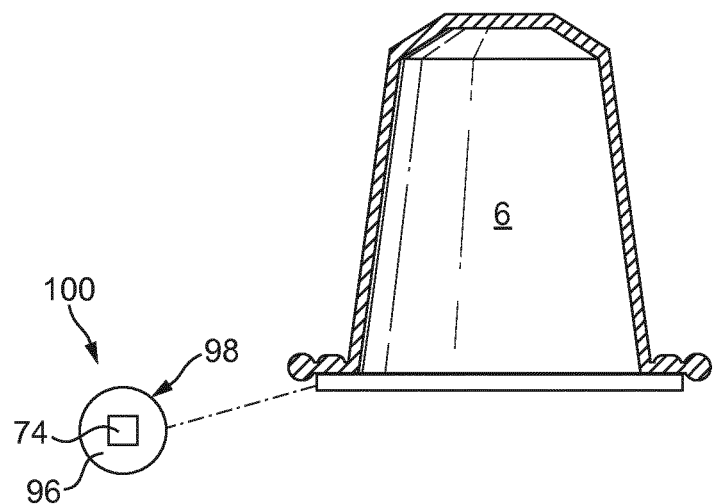

An alternate attachment 100 may comprise the afore-described code 74, arranged on a surface thereof, the attachment 100 configured for attachment to any of the afore-described containers 6. The attachment 100, an example which is illustrated in FIG. 7, comprises: a carrier 96 for carrying of the code 74; an attachment member 98 for attachment of the carrier 96 to the container 6. In this way an image of the code 74 can be captured by the image capturing device 106 as if it were formed integrally one the container 6. Examples of suitable attachment members comprise: an adhesive strip (as illustrated); a mechanical fastener such as a clip, bolt or bracket. The use of such an attachment 94 is particularly useful if: an end-user defined recipe is applied to the container 6; a clean or other maintenance related operation is required; it is more cost effective to form the code 74 on a substrate separate from the container 6 and attach said substrate the container.

LIST OF REFERENCES

2 Beverage or Foodstuff Preparation System
4 Beverage or Foodstuff Preparation machine
10 Housing
108 Base
110 Body
14 Container processing subsystem
12 Fluid supply
20 Reservoir
22 Fluid pump
24 Fluid thermal exchanger
Embodiment 1
26 Extraction Unit
28 Injection head
30 Capsule holder
32 Capsule holder loading system
34A Capsule insertion channel
34B Capsule ejection channel
Embodiment 2
40 Agitator unit
42 Auxiliary product unit
44 Thermal exchanger
46 Receptacle support
16 Control subsystem
48 User interface
50 Processing subsystem
112 Memory subsystem
116 Preparation program
52 Sensors (temperature, receptacle level, flow rate, torque, velocity)
54 Power supply
56 Communication interface
18 Code processing subsystem
106 Image capturing device
92 Image processing device
114 Output device
6 Container (Capsule/Receptacle/Packet)
Capsule/Receptacle
58 Body portion
60 Lid portion
62 Flange portion
Packet
64 Sheet material
66 Internal volume
68 Inlet
70 Outlet
74 Code
104 Planform
76 Unit
78 Data portion
90 Encoding area
82 Data unit
80 Reference portion
86 Reference unit
88 Reference point
118 Orientation Identifier

The invention claimed is:

1. A container for a foodstuff or beverage preparation machine, the container containing beverage or foodstuff material and comprising a plurality of codes, each code encoding preparation information for a foodstuff or beverage preparation process by the foodstuff or beverage preparation machine, the plurality of codes is formed in a grid with adjacent columns aligned or with adjacent columns offset, each code comprising:
a reference portion and a data portion, and each code has a peripheral length of 600-1600 µm, wherein a ratio of the peripheral length of the code to a diameter of the container is 0.006 to 0.08:
the reference portion comprising:
three reference units uniquely defining a reference point; and
a reference line extending from the reference point, the reference portion arranged within a circular encoding area; and
the data portion comprising a data unit arranged on a virtual line, the virtual line extending from the reference point and arranged at an angle α to the reference line, the data unit arranged a distance from the reference point, and the distance encoding a parameter of the preparation information;
wherein the plurality of codes is formed in a tessellating pattern.

2. The container of claim 1, wherein the data unit is arranged at any continuous distance from the reference point.

3. The container of claim 1, wherein the data portion comprises a plurality of data units, each arranged on a virtual line at a distance from the reference point and at least partially encoding a parameter of the preparation information, the virtual lines each arranged at different angles α to the reference line.

4. The container of claim 3, wherein adjacent virtual lines are arranged at equal angles to each other.

5. The container of claim 3, wherein a reference line orientation identifier defines the reference point, wherein the reference line orientation identifier comprises:
   a reference unit which is identifiable from other units of the code by one or a combination of size, shape, and color; or
   a plurality of reference units which are the same as the three reference units and/or the plurality of data units of the code, wherein the plurality of reference units of the reference line orientation identifier are arranged with a configuration defining the reference point.

6. The container of claim 5, wherein the reference portion comprises a further reference unit, which is arranged:
   at a greater radial position from the reference line orientation identifier than the plurality of data units; and/or
   at a predetermined reserved radial position from the reference line orientation identifier.

7. The container of claim 1, wherein the data portion comprises the circular encoding area, the data unit thereof being arranged within the bounds of the circular encoding area, whereby the encoding area is radially intersected by the reference line.

8. The container of claim 1, wherein the data unit further encodes metadata associated with the parameter, the metadata being encoded discretely to either enable identification of the parameter and/or a property associated therewith.

9. The container of claim 8, wherein the metadata is encoded as a variable comprising:
   a unit length of the data unit selected from one of a plurality of predetermined unit lengths; and/or
   an offset of a center of the data unit from the virtual line, the offset along an offset line orthogonal the virtual line, the offset selected from one of a plurality of predetermined offsets.

10. The container of claim 1, wherein a plurality of data units are each arranged along a corresponding virtual line, and each data unit encodes a separate parameter, each data unit being identifiable by metadata.

11. The container of claim 1, wherein the code is formed on a surface of the container or on an attachment attached to the container.

12. The container of claim 1, wherein the container is selected from the group consisting of: a capsule; a packet; a receptacle for end user consumption of the beverage or foodstuff therefrom; and a collapsible container.

13. A beverage or foodstuff preparation system comprising:
   a container for containing beverage or foodstuff material and comprising a plurality of codes, each code encoding preparation information for a foodstuff or beverage preparation process by the foodstuff or beverage preparation machine, the plurality of codes is formed in a grid with adjacent columns aligned or with adjacent columns offset,
   each code comprising a reference portion and a data portion, and each code has a peripheral length of 600-1600 μm,
      the reference portion comprising:
         three reference units defining a reference point; and
         a reference line extending from the reference point, the reference portion arranged within a circular encoding area; and
      the data portion comprising a data unit arranged on a virtual line, the virtual line extending from the reference point and arranged at an angle α to the reference line, the data unit arranged a distance from the reference point, and the distance encoding a parameter of the preparation information;
   wherein the plurality of codes is formed in a tessellating pattern; and
   a beverage or foodstuff preparation machine, the preparation machine comprising:
      a container processing subsystem to receive the container and to prepare a beverage or foodstuff therefrom according to the parameter encoded by the distance of the data unit from the reference point;
      a code processing subsystem operable to: obtain a digital image of each code of the container and process the digital image to decode the encoded preparation information; and
      a control subsystem operable to control the container processing subsystem using the decoded preparation information in order to prepare the beverage or foodstuff material into the beverage or foodstuff, and
   wherein the code processing subsystem is configured to decode the encoded preparation information by: locating the three reference units and the data unit of each code; identifying the three reference units and determining therefrom the reference point and the reference line extending from the reference point; determining for the data unit the distance along the virtual line from the reference point; and converting the determined distance into an actual value of a parameter using a stored relationship between the parameter and the determined distance.

14. The beverage or foodstuff preparation system of claim 13, wherein the stored relationship is non-linear.

15. A method of encoding preparation information, the method comprising forming a plurality of codes on:
   a container for a beverage or foodstuff preparation machine, the container containing a beverage or foodstuff material; or
   an attachment for attachment to the container or the beverage of foodstuff preparation machine,
   each code encoding preparation information for a foodstuff or beverage preparation process by the foodstuff or beverage preparation machine, the plurality of codes are formed in a grid with adjacent columns aligned or with adjacent columns offset,
   the method further comprising:
      arranging, for each code:
         three reference units to define a reference point; and
         a reference line extending from the reference point of a reference portion,
         the reference portion arranged within a circular encoding area; and
         encoding a parameter of the preparation information with a data portion of the code by arranging a data unit on a virtual line that extends from the reference point and arranged at an angle to the reference line, the data unit being arranged a distance extending along the virtual line from the intersection, and the distance encodes the parameter of the preparation information,
   wherein each code has a peripheral length of 600-1600 μm;
   wherein the plurality of codes is formed in a tessellating pattern.

16. The container of claim 1, wherein the data portion comprises another data unit arranged on an encoding line, the encoding line extending from the reference point and arranged at another angle α to the reference line.

17. The container of claim 1, wherein at least one of the data portion or the reference portion has a length of 50-250 μm.

18. The container of claim 17, wherein at least one of the data portion or the reference portion is one of a substantially circular portion or a quadrilateral portion, and the length is one of a diameter for the substantially circular portion or a side length for the quadrilateral portion.

19. A container for a foodstuff or beverage preparation machine, the container containing beverage or foodstuff material and comprising a plurality of codes, each code encoding preparation information for a foodstuff or beverage preparation process by the foodstuff or beverage preparation machine, the plurality of codes is formed in a grid with adjacent columns aligned or with adjacent columns offset,
    each code comprising a reference portion and a data portion, each code having a peripheral length of 600-1600 μm, wherein a ratio of the peripheral length of the code to a diameter of the container is 0.006 to 0.08:
    the reference portion comprising:
        three reference units defining a reference point; and
        a reference line extending from the point,
        the reference portion arranged within a circular encoding area; and
    the data portion comprising a data unit arranged on a virtual line, the virtual line extending from the reference point and arranged at an angle α to the reference line, the data unit arranged a distance from the reference point, and the distance encoding a parameter of the preparation information,
    wherein the three reference units and the data unit are all the same size;
    wherein the plurality of codes is formed in a tessellating pattern.

20. The container of claim 1, wherein each of the three reference units is the same size.

21. The container of claim 1, wherein each of the three reference units and the data unit is the same size.

22. The container of claim 1, wherein the three reference units are arranged only within the circular encoding area.

23. The container of claim 1, wherein the three reference units are distal from a center of the circular encoding area.

24. The container of claim 1, wherein the three reference units are not coincident.

25. The container of claim 1, wherein the three reference units are arranged as a right-angled triangle, wherein the reference line has an orientation parallel to a side of the right-angled triangle, and wherein the reference portion is arranged at a central region of the circular encoding area.

* * * * *